United States Patent
Hirakawa et al.

(10) Patent No.: US 8,164,247 B2
(45) Date of Patent: Apr. 24, 2012

(54) ELECTRON EMITTING ELEMENT, ELECTRON EMITTING DEVICE, LIGHT EMITTING DEVICE, IMAGE DISPLAY DEVICE, AIR BLOWING DEVICE, COOLING DEVICE, CHARGING DEVICE, IMAGE FORMING APPARATUS, AND ELECTRON-BEAM CURING DEVICE

(75) Inventors: Hiroyuki Hirakawa, Osaka (JP); Ayae Nagaoka, Osaka (JP); Yasuo Imura, Osaka (JP); Tadashi Iwamatsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 164 days.

(21) Appl. No.: 12/782,102

(22) Filed: May 18, 2010

(65) Prior Publication Data

US 2010/0296845 A1 Nov. 25, 2010

(30) Foreign Application Priority Data

May 19, 2009 (JP) .................................. 2009-121460

(51) Int. Cl.
*H01J 17/49* (2012.01)
(52) U.S. Cl. ....................................... 313/495; 313/497
(58) Field of Classification Search ........... 313/495–497
See application file for complete search history.

(56) References Cited

U.S. PATENT DOCUMENTS

| | | | |
|---|---|---|---|
| 4,857,161 A | 8/1989 | Borel | |
| 5,891,548 A | 4/1999 | Graiver | |
| 5,962,959 A | 10/1999 | Iwasaki et al. | |
| 6,130,503 A | 10/2000 | Negishi et al. | |
| 6,166,487 A | 12/2000 | Negishi et al. | |
| 6,462,467 B1 | 10/2002 | Russ | |
| 2001/0017369 A1 | 8/2001 | Iwasaki et al. | |
| 2001/0026123 A1 | 10/2001 | Yoneda | |

(Continued)

FOREIGN PATENT DOCUMENTS

CN 1763885 A 4/2006

(Continued)

OTHER PUBLICATIONS

U.S. Appl. No. 12/695,381, filed Jan. 28, 2010, entitled "Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element".

(Continued)

*Primary Examiner* — Anne Hines
(74) *Attorney, Agent, or Firm* — Nixon & Vanderhye, P.C.

(57) ABSTRACT

The present invention provides an electron emitting element which has good energy efficiency and which is capable of controlling a value of current flowing in an electron acceleration layer and an amount of emitted electrons by adjusting a resistance value of the electron acceleration layer and an amount of generated ballistic electrons. An electron emitting element 1 includes an electron acceleration layer 4 including a fine particle layer containing insulating fine particles. In the electron emitting element 1, $$Ie = \alpha \cdot R^{-0.67}$$

where Ie [A/cm$^2$] is electron emission current per unit area during the voltage application and R is element resistance [Ω·cm$^2$] per unit area, the element resistance being obtained by dividing (a) a voltage applied between the electrode substrate 2 and the thin-film electrode 3 during the voltage application by (b) current in element per unit area which current flows between the electrode substrate 2 and the thin-film electrode 3 during the voltage application, and where α is not less than $2.0 \times 10^{-6}$, and the electron emission current Ie is not less than $1.0 \times 10^{-9}$.

23 Claims, 10 Drawing Sheets

U.S. PATENT DOCUMENTS

| | | | |
|---|---|---|---|
| 2004/0021434 A1 | 2/2004 | Yoneda | |
| 2004/0197943 A1 | 10/2004 | Izumi | |
| 2004/0246408 A1 | 12/2004 | Ando | |
| 2006/0061967 A1 | 3/2006 | Kim et al. | |
| 2006/0152138 A1 | 7/2006 | Hori et al. | |
| 2006/0186786 A1 | 8/2006 | Iwamatsu et al. | |
| 2006/0290291 A1 | 12/2006 | Aizawa | |
| 2010/0196050 A1 | 8/2010 | Iwamatsu | |
| 2010/0215402 A1 | 8/2010 | Nagaoka | |
| 2010/0278561 A1 | 11/2010 | Kanda | |
| 2010/0295465 A1 | 11/2010 | Hirakawa | |
| 2010/0296842 A1 | 11/2010 | Imura | |
| 2010/0296843 A1 | 11/2010 | Hirawaka | |
| 2010/0296844 A1 | 11/2010 | Imura | |
| 2010/0307724 A1 | 12/2010 | Ichii et al. | |
| 2010/0327730 A1 | 12/2010 | Hirakawa | |

FOREIGN PATENT DOCUMENTS

| | | |
|---|---|---|
| CN | 1849673 A | 10/2006 |
| EP | 1 617 449 | 1/2006 |
| EP | 1 617 450 A2 | 1/2006 |
| EP | 1 635 369 | 3/2006 |
| JP | 60-20027 A | 2/1985 |
| JP | 62-172631 | 7/1987 |
| JP | 1-107440 A | 4/1989 |
| JP | 1-149335 A | 6/1989 |
| JP | 1-279557 | 11/1989 |
| JP | 1-298623 | 12/1989 |
| JP | 6-255168 A | 9/1994 |
| JP | 8-97582 A | 4/1996 |
| JP | 8-250766 A | 9/1996 |
| JP | 9-007499 A | 1/1997 |
| JP | 9-252068 A | 9/1997 |
| JP | 10-121042 | 5/1998 |
| JP | 10-308164 A | 11/1998 |
| JP | 10-308165 | 11/1998 |
| JP | 11-251069 A | 9/1999 |
| JP | 2000-76986 A | 3/2000 |
| JP | 2000-311640 | 11/2000 |
| JP | 2001-68012 A | 3/2001 |
| JP | 2001-195973 A | 7/2001 |
| JP | 2001-357961 | 12/2001 |
| JP | 2002-93310 A | 3/2002 |
| JP | 2002-208346 A | 7/2002 |
| JP | 2002-279892 A | 9/2002 |
| JP | 2003-115385 | 4/2003 |
| JP | 2003-173744 A | 6/2003 |
| JP | 2003-173878 A | 6/2003 |
| JP | 2003-331712 | 11/2003 |
| JP | 2004-241161 | 8/2004 |
| JP | 2004-253201 A | 9/2004 |
| JP | 2004-296781 | 10/2004 |
| JP | 2004-296950 | 10/2004 |
| JP | 2004-327084 A | 11/2004 |
| JP | 2005-190878 A | 7/2005 |
| JP | 2005-209396 A | 8/2005 |
| JP | 2005-326080 A | 11/2005 |
| JP | 2006-0541621 | 2/2006 |
| JP | 2006-100758 A | 4/2006 |
| JP | 2006-190545 A | 7/2006 |
| JP | 2006-236964 | 9/2006 |
| JP | 2007-290873 | 11/2007 |
| JP | 2009-146891 A | 7/2009 |
| JP | 4314307 B1 | 8/2009 |
| JP | 2010-267492 A | 11/2010 |
| WO | 2005/004545 A1 | 1/2005 |
| WO | WO 2009/066723 | 5/2009 |

OTHER PUBLICATIONS

U.S. Appl. No. 12/696,905, filed Jan. 29, 2010, entitled Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element.

U.S. Appl. No. 12/698,342, filed Feb. 2, 2010, entitled Electron Emitting Element, Electron Emitting Device, Light Emitting Device, Air Blowing Device, Charging Device, Electron-Beam Curing Device, and Method for Producing Electron Emitting Element.

U.S. Appl. No. 12/698,435, filed Feb. 2, 2010, entitled Electron Emitting Element and Method for Producing Electron Emitting Element.

U.S. Appl. No. 12/699,349, filed Feb. 3, 2010, entitled "Electron Emitting Element, Electron Emitting Device, Light Emitting Device, Image Display Device, Cooling Device, and Charging Device".

U.S. Appl. No. 12/781,997, filed May 18, 2010, entitled "Electron Emitting Element, Electron Emitting Device, Charging Device, Image Forming Apparatus, Electron-Beam Curing Device, Light Emitting Device, Image Display Device, Air Blowing Device, and Cooling Device" (not yet published).

U.S. Appl. No. 12/782,024, filed May 18, 2010, entitled "Light Emitting Element, Light Emitting Device, Image Display Device, Method of Driving Light Emitting Element, and Method of Producing Light Emitting Element".

U.S. Appl. No. 12/743,741, filed May 18, 2010, entitled "Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element".

Naoi et al., "TiO2 Films Loaded with Silver Nanoparticles: Control of Multicolor Photochromic Behavior", J. AM. Chem. Soc., vol. 126, No. 11, pp. 3664-3668, (2004).

Yamaguchi et al, "Development of Highly Efficient Electron-Beam Source by Use of Carbon Nanotube for Image Recording", Collected Papers of Japan Hardcopy 97, The Imaging Society of Japan, Jul. 1997, pp. 221-224.

English translation of the International Search Report mailed Feb. 24, 2009 in corresponding PCT application PCT/JP2008/071102.

U.S. Appl. No. 12/940,546, filed Nov. 5, 2010, entitled "Heat Exchanger".

English version of ISR for PCT/JP2009/052904 mailed Apr. 21, 2009.

ISR for PCT/JP2008/071102, mailed Feb. 24, 2009 (081423/PCT).

Electrophotography-Bases and Applications (1998; P. 213), The Society of Electrophotography of Japan, Corona Publishing CO., LTD. (with partial English translation).

Ionic winds for locally enhanced cooling, David B. Go, Suresh V. Garimella, and Timothy S. Fisher, J. Appl. Phys., 102, 053302 (2007).

Naoi et al, "TiO2 Films Loaded with Silver Nanoparticles: Control of Multicolor Photochromic Behavior" J. Am. Chem. Soc., vol. 126, No. 11, p. 3664-3668 (2004).

Yamaguchi and three others, "Development of Highly Efficient Electron-Beam Source by Use of Carbon Nanotube for Image Recording", Collected Papers of Japan Hardcopy 97, The Imaging Society of Japan, p. 221-224, Jul. 1997 (with partial English translation).

U.S. Appl. No. 12/956,136, filed Nov. 30, 2010, entitled "Electron Emitting Element, Method for Producing Electron Emitting Element, Electron Emitting Device, Charging Device, Image Forming Apparatus, Electron-Beam Curing Device, Image Display Device, Air Blowing Device, Cooling Device" (not yet published), Hiroyuki Hirakawa.

ELECTRON EMITTING ELEMENT, ELECTRON EMITTING DEVICE, LIGHT EMITTING DEVICE, IMAGE DISPLAY DEVICE, AIR BLOWING DEVICE, COOLING DEVICE, CHARGING DEVICE, IMAGE FORMING APPARATUS, AND ELECTRON-BEAM CURING DEVICE

This Nonprovisional application claims priority under 35 U.S.C. §119(a) on Patent Application No. 2009-121460 filed in Japan on May 19, 2009, the entire contents of which are hereby incorporated by reference.

TECHNICAL FIELD

The present invention relates to an electron emitting element for emitting electrons by application of a voltage, an electron emitting device, a light emitting device, an image display device, an air blowing device, a cooling device, a charging device, an image forming apparatus, and an electron-beam curing device, each of which uses the electron emitting element.

BACKGROUND ART

A Spindt-type electrode and a carbon nanotube electrode (CNT) have been known as conventional electron emitting elements. Applications of such conventional electron emitting elements to, for example, the field of Field Emission Display (FED) have been studied. Such electron emitting elements are caused to emit electrons by tunnel effect resulting from formation of an intense electric field of approximately 1 GV/m that is produced by application of a voltage to a pointed section.

However, each of these two types of the electron emitting elements has an intense electric field in the vicinity of a surface of an electron emitting section. Accordingly, electrons emitted obtain a large amount of energy due to the electric field. This makes it easy to ionize gas molecules. However, cations generated in the ionization of the gas molecules are accelerated in a direction of a surface of the electron emitting element due to the intense electric field and collide with the surface. This causes a problem of breakdown of the electron emitting element due to sputtering. Further, ozone is generated before ions are generated, because oxygen in the atmosphere has dissociation energy that is lower than ionization energy. Ozone is harmful to human bodies, and oxidizes various substances because of its strong oxidizing power. This causes a problem in that members around the electron emitting element are damaged. In order to prevent this problem, the members used around the electron emitting element are limited to expensive members that have resistance to ozone.

Meanwhile, an MIM (Metal Insulator Metal) type and an MIS (Metal Insulator Semiconductor) type have been known as other types of electron emitting elements. These electron emitting elements are surface-emission-type electron emitting elements which accelerate electrons by utilizing quantum size effect and an intense electric field in the electron emitting element so that electrons are emitted from a flat surface of the element. These electron emitting elements do not require an intense electric field outside the elements, because the electrons which are accelerated in respective electron acceleration layers inside the elements are emitted to the outside. Therefore, each of the MIM type and the MIS type electron emitting elements can overcome the problems such that (i) the element is broken down by the sputtering which occurs due to ionization of gas molecules and (ii) ozone is generated, in the Spindt-type, CNT type, and BN type electron emitting elements.

For example, Patent Literature 1 discloses an MIM type electron emitting element in which an insulating film having fine particles made of metal or the like dispersed therein is provided between two electrodes. The MIM type electron emitting element emits electrons in such a manner that electrons are injected from one of the electrodes into the insulating film, the electrons thus injected are accelerated in the insulating film, and the electrons are emitted to outside through the other electrode having a thickness of several tens Å to 1000 Å.

CITATION LIST

Patent Literature 1

Japanese Patent Application Publication, Tokukaihei, No. 1-298623 A (Publication Date: Dec. 1, 1989)

SUMMARY OF INVENTION

Technical Problem

However, surface-emission-type electron emitting elements such as the MIM type electron emitting element disclosed in Patent Literature 1 cause a problem that the electron emitting element (hereinafter also referred to simply as "element") is broken down. Specifically, since an insulating film having a thickness which allows tunneling of electrons has a very low resistance value, excess current flows in the element. This leads to occurrence of dielectric breakdown and generation of heat, thereby causing damage on fine particles and the insulating film.

Solution to Problem

The present invention was attained in view of the above problems, and an object of the present invention is to provide an electron emitting element which is good in energy efficiency and which is capable of controlling a value of current flowing in an electron acceleration layer for accelerating electrons and an amount of electrons to be emitted, by adjusting a resistance value of the electron acceleration layer and an amount of ballistic electrons to be generated.

In order to attain the above object, an electron emitting element of the present invention includes an electrode substrate and a thin-film electrode which are provided so as to face each other; and an electron acceleration layer sandwiched between the electrode substrate and the thin-film electrode, as a result of a voltage applied between the electrode substrate and the thin-film electrode, electrons being accelerated in the electron acceleration layer so as to be emitted from the thin-film electrode, wherein: the electron acceleration layer includes a fine particle layer containing at least insulating fine particles, and $$Ie = \alpha \cdot R^{-0.67}$$

where Ie [A/cm$^2$] is electron emission current per unit area during voltage application and R is element resistance [Ω·cm$^2$] per unit area, the element resistance being obtained by dividing (a) the voltage applied between the electrode substrate and the thin-film electrode during the voltage application by (b) current in element per unit area which current flows between the electrode substrate and the thin-film electrode during the voltage application, and where α is not less than 2.0×10⁻⁶, and the electron emission current Ie is not less than 1.0×10⁻⁹.

An electron emission mechanism of the electron emitting element having the above arrangement is considered to be similar to an operation mechanism of the so-called MIM type electron emitting element in which an insulating layer is inserted between two conductive films. Regarding a mechanism of formation of a current path at the time when an electric field is applied to an insulating layer in the MIM type electron emitting element, various explanations are provided as a general explanation. Examples of such explanations are: (a) diffusion of an electrode material into an insulating layer; (b) crystallization of the insulating material; (c) formation of a conductive path called filament; (d) variation in the insulating material in terms of stoichiometry; and (e) trapping of electrons due to a defect in the insulating material and an intense electric field region locally formed by the trapped electrons. However, the mechanism has not been determined yet. In any explanation, according to the above arrangement of the present invention, the electrons are considered to be emitted to the outside of the element by (i) formation of the current path at the time when an electric field is applied to the electron acceleration layer made of a fine particle layer that includes insulating fine particles and that corresponds to an insulating layer, (ii) generation of ballistic electrons as a result of accelerating, by the electric field, a part of electrons in the current, and (iii) transmission of the ballistic electrons through the thin-film electrode that is one of the electrode substrate and the thin-film electrode that correspond to two conductive films.

According to the above arrangement, a change in parameters such as a thickness of the electron acceleration layer and a shape of the thin-film electrode changes a resistance value of the electron acceleration layer, thereby changing an amount of ballistic electrons to be generated.

Therefore, it is possible to control a value of current flowing in the electron acceleration layer and an amount of emitted electrons by adjusting a resistance value of the electron acceleration layer and an amount of generated ballistic electrons which are adjusted by changing these parameters. Since the insulating fine particles also function to release Joule heat caused by current allowing in the electron acceleration layer, it is possible to prevent the electron emitting element from being broken down by heat.

Thus, the electron emitting element of the present invention arranged as above is capable of controlling a value of current flowing in the electron acceleration layer and an amount of emitted electrons.

As a result of repeated experiments for improvement of element characteristics of such an electron emitting element, the inventors of the present invention found that it is possible to obtain a practical electron emitting element having good energy efficiency by defining a relationship between (i) the electron emission current Ie [A/cm²] per unit area during the voltage application and (ii) the element resistance R [Ω·cm²] per unit area, the element resistance R being obtained by dividing (a) a voltage applied between the electrode substrate and the thin-film electrode during the voltage application by (b) current in element per unit area which current flows between the electrode substrate 2 and the thin-film electrode 3 during the voltage application. Specifically, according to an electron emitting element of the present invention, $$Ie = \alpha \cdot R^{-0.67}$$

where Ie [A/cm²] is electron emission current per unit area during voltage application and R is element resistance [Ω·cm²] per unit area, the element resistance being obtained by dividing (a) the voltage applied between the electrode substrate and the thin-film electrode during the voltage application by (b) current in element per unit area which current flows between the electrode substrate and the thin-film electrode during the voltage application, and where α is not less than 2.0×10⁻⁶, and the electron emission current Ie is not less than 1.0×10⁻⁹.

The above arrangement allows the electron emitting element of the present invention to be a practical emitting element having good energy efficiency. An electron emitting element that is out of the above range causes (i) a problem of energy efficiency that an amount of electrons emitted to an outside of the element is small compared with power consumption in the element or (ii) a problem that an absolute amount of electrons emitted to the outside of the element is small even though the problem that an amount of electrons emitted to an outside of the element is small compared with power consumption in the element does not occur. On this account, such an electron emitting element is not practical.

An electron emitting device of the present invention includes: the aforementioned electron emitting element; and a power supply section for applying a voltage between an electrode substrate and a thin-film electrode provided in the any one of the aforementioned electron emitting elements.

As has been already described, the electron emitting element of the present invention is an electron emitting element which does not cause dielectric breakdown in an insulating layer and which can be produced by use of an inexpensive device. Therefore, the electron emitting device employing the electron emitting element is also an electron emitting device which does not cause dielectric breakdown in an insulating layer and which can be produced by use of an inexpensive device.

Further, a light emitting device, an image display device, an air blowing device, a cooling device, a charging device, an image forming apparatus, and an electron-beam curing device, each employing the electron emitting device of the present invention, are included in the scope of the present invention.

Advantageous Effects of Invention

As described above, according to the electron emitting element of the present invention, the electron acceleration layer includes a fine particle layer containing insulating fine particles, and $$Ie = \alpha \cdot R^{-0.67}$$

where Ie [A/cm²] is electron emission current per unit area during voltage application and R is element resistance [Ω·cm²] per unit area, the element resistance being obtained by dividing (a) the voltage applied between the electrode substrate and the thin-film electrode during the voltage application by (b) current in element per unit area which current flows between the electrode substrate and the thin-film electrode during the voltage application, and where α is not less than 2.0×10⁻⁶, and the electron emission current Ie is not less than 1.0×10⁻⁹.

With the arrangement, it is possible to provide a practical electron emitting element which has good energy efficiency and which is capable of controlling a value of current flowing in an electron acceleration layer and an amount of emitted electrons by adjusting a resistance value of the electron acceleration layer and an amount of generated ballistic electrons.

DESCRIPTION OF EMBODIMENTS

The following description deals with Embodiments and Examples of an electron emitting element and an electron emitting device of the present invention, with reference to FIGS. 1 through 14. Note that Embodiments and Examples described below are merely specific examples of the present invention and by no means limit the present invention.

Embodiment 1

Figure 1:
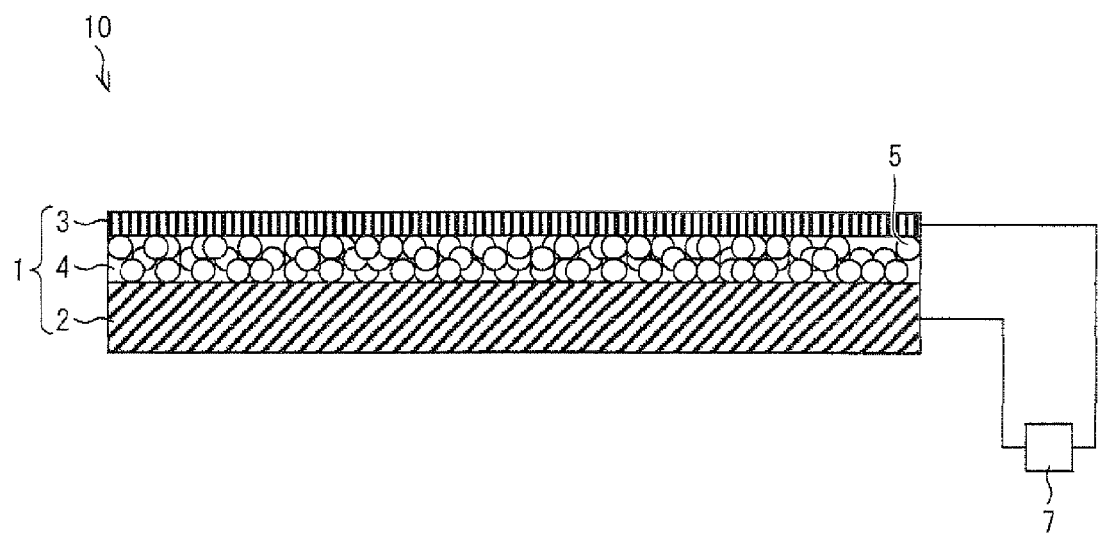
FIG. 1 is a schematic view illustrating an arrangement of an electron emitting device including an electron emitting element according to one embodiment of the present invention.

FIG. 1 is a schematic view illustrating an arrangement of an electron emitting device 10 including an electron emitting element 1 according to one embodiment of the present invention. As shown in FIG. 1, the electron emitting device 10 includes an electron emitting element 1 according to one embodiment of the present invention, and a power supply 7. The electron emitting element 1 includes: an electrode substrate 2 as a bottom electrode; a thin-film electrode 3 as an upper electrode; and an electron acceleration layer 4 sandwiched therebetween. Further, the electrode substrate 2 and the thin-film electrode 3 are connected to the power supply 7, so that a voltage can be applied between the electrode substrate 2 and the thin-film electrode 3 which are provided so as to face each other.

The electron emitting element 1 applies a voltage between the electrode substrate 2 and the thin-film electrode 3 so that current flows through the electron acceleration layer 4 provided between the electrode substrate 2 and the thin-film electrode 3. A part of electrons in the current are caused to transmit through the thin-film electrode 3 and/or be emitted through holes (gaps), in the thin-film electrode 3, which are formed due to gaps between insulating fine particles, or through uneven portions between the insulating fine particles, as ballistic electrons due to an intense electric field formed by the applied voltage.

The electrode substrate 2 serving as the lower electrode also acts as a supporting member of the electron emitting element, in addition to the function as the electrode. Accordingly, the electrode substrate 2 is not specifically limited in material as long as the material has a sufficient strength, excellent adhesiveness with respect to a substance in direct contact with the material and sufficient electrical conductivity.

Examples of the electrode substrate 2 include: metal substrates made of, for example, SUS, Ti, and Cu; and semiconductor substrates made of, for example, Si, Ge, and GaAs. In cases where an insulator substrate such as a glass substrate or a plastic substrate is used, an electrically conductive material such as metal may be attached, as an electrode, to a surface thereof (an interface of the insulator substrate and the electron acceleration layer 4). A constituent material of the electrically conductive material to be attached to the surface of the insulator substrate is not specifically limited as long as a thin film of a material excellent in electrical conductivity can be formed by magnetron sputtering or the like. Note that, if steady operation of the electron emitting element in the atmosphere is desired, a conductor having high resistance to oxidation is preferably used and noble metal is more preferably used as the constituent material. An ITO thin-film which is widely used as an electrically conductive oxide material for a transparent electrode is also applicable. Alternatively, it is possible to use a metal thin film obtained by first forming a Ti film of 200 nm on a surface of a glass substrate and then forming a Cu film of 1000 nm on the Ti film, because a strong thin film can be formed. In this case, materials and values are not specifically limited to those described above.

A material of the thin-film electrode 3 is not specifically limited as long as the material makes it possible to apply a voltage. A material which has a low work function and from which a thin-film can be formed is expected to provide a greater effect, in view of emitting, with a minimum energy loss, electrons which have high energy due to acceleration within the electron acceleration layer 4. Examples of such a material include: gold, silver, carbon, tungsten, titanium, aluminum, and palladium each of which has a work function in a range of 4 eV to 5 eV. Among these materials, in particular, in consideration of an operation under an atmospheric pressure, the best material is gold which is free from oxide or sulfide formation reaction. Further, silver, palladium, or tungsten each of which has a relatively small oxide formation reaction is also applicable material that can be used without any problem.

The thickness of the thin-film electrode 3 is important as a condition to efficiently emit electrons from the electron emitting element 1 to the outside, and is preferably in a range from 10 to 100 nm. A minimum thickness necessary for the thin-film electrode 3 to serve as a plane electrode is 10 nm, and a thickness below 10 nm does not allow the thin-film electrode 3 to maintain its electrical conductivity. Meanwhile, a maximum thickness of the thin-film electrode 3 that causes electrons to be emitted to the outside from the electron emitting element 1 is 100 nm. If the thickness of the thin-film electrode 3 is over 100 nm, emission of ballistic electrons is extremely reduced. It is considered that the reduction of the emission of ballistic electrons is caused because the thin-film electrode 3 absorbs the ballistic electrons, or the ballistic electrons is reflected by the thin-film electrode 3 so that the electron acceleration layer 4 receives the ballistic electrons again.

Figure 2:
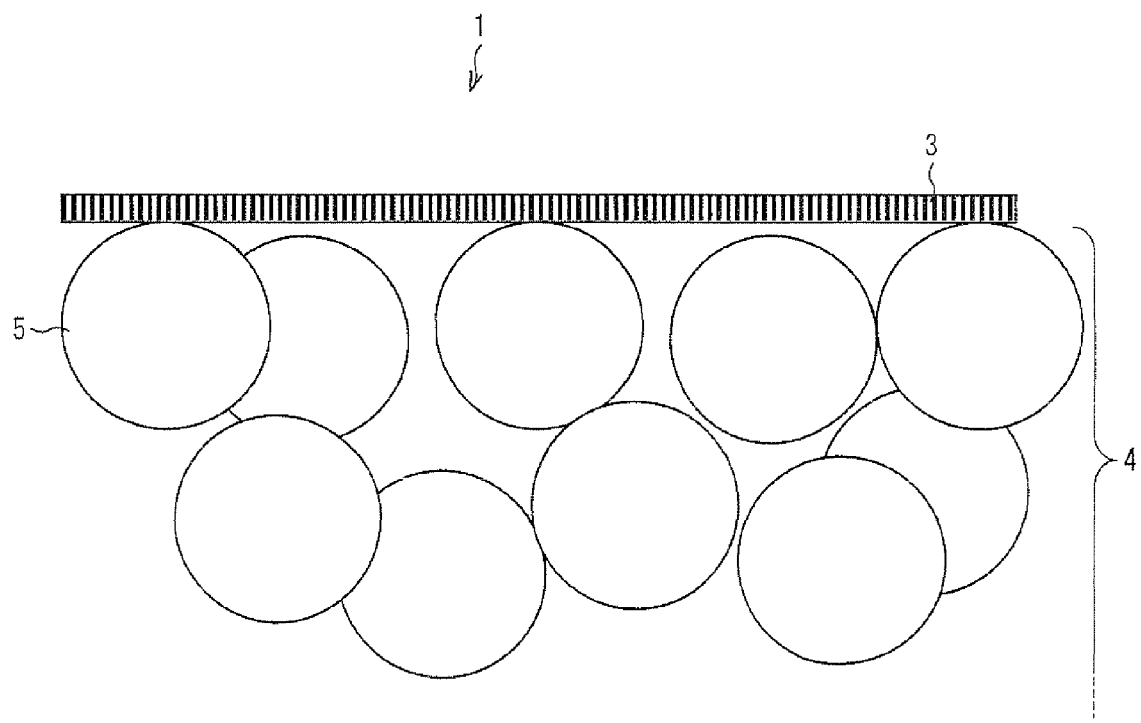
FIG. 2 is a schematic view illustrating the vicinity of an electron acceleration layer in the electron emitting element included in the electron emitting device of FIG. 1.

FIG. 2 is a schematic view illustrating the electron acceleration layer 4 of the electron emitting element 1. The electron acceleration layer 4 includes a fine particle layer containing insulating fine particles 5, and does not contain conductive fine particles nor a basic dispersant. According to the electron emitting element 1 of the present invention, an electron acceleration layer may include conductive fine particles 6 and/or a basic dispersant 106 in addition to the insulating fine particles 5.

Figure 3:
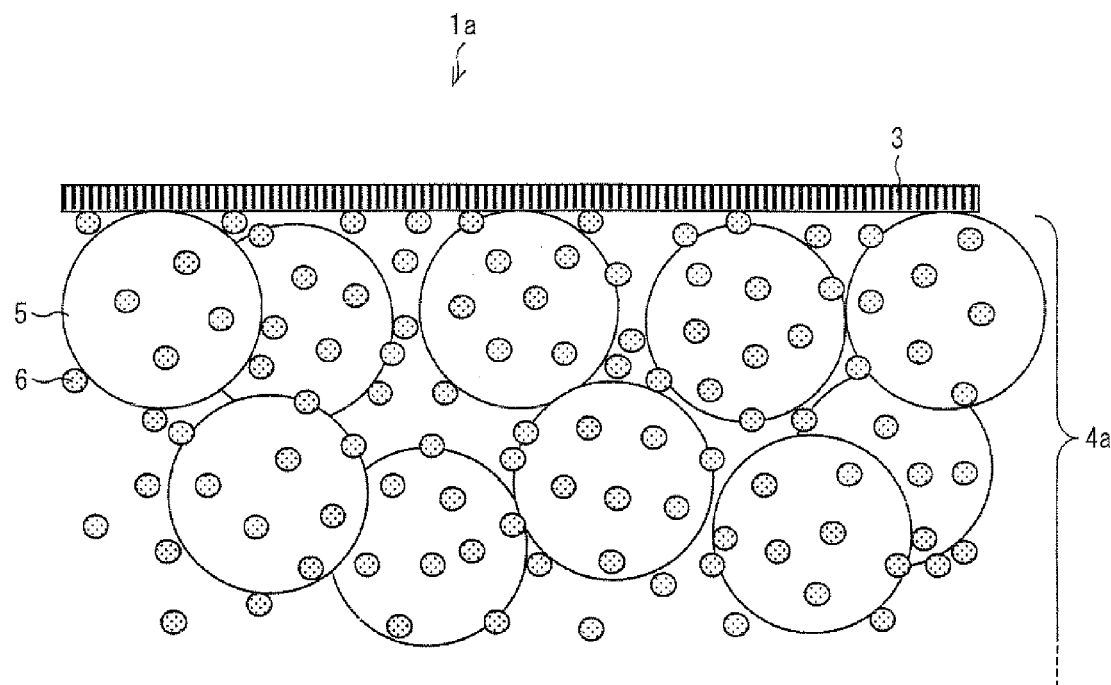
FIG. 3 is a schematic view illustrating the vicinity of an electron acceleration layer in another electron emitting element of the present invention included in the electron emitting device of FIG. 1.
Figure 4:
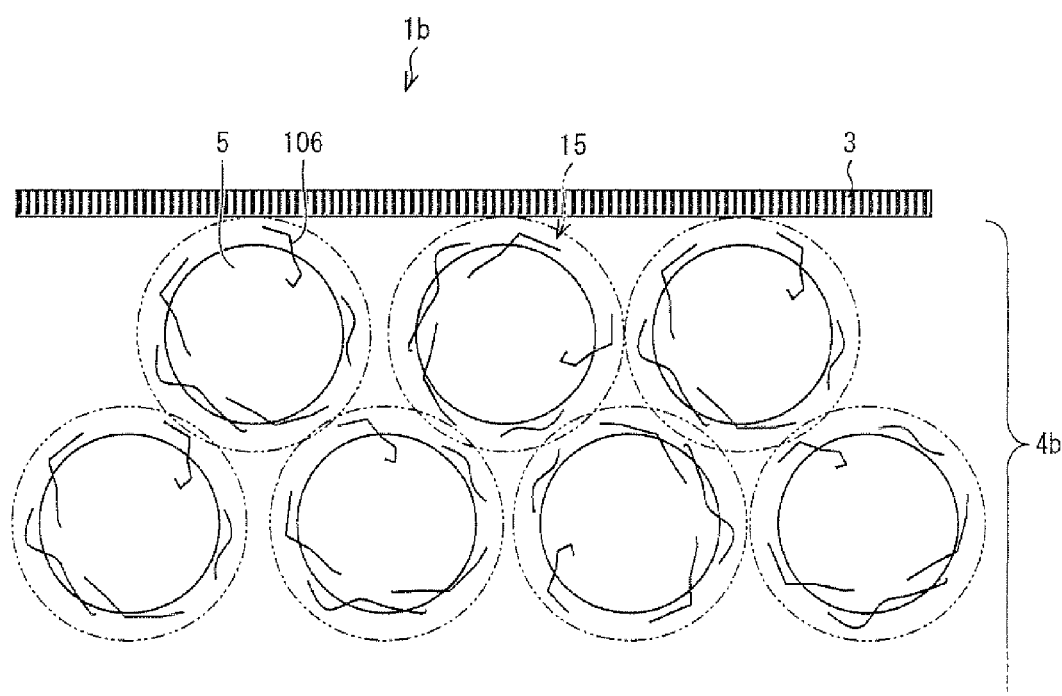
FIG. 4 is a schematic view illustrating the vicinity of an electron acceleration layer in further another electron emitting element of the present invention included in the electron emitting device of FIG. 1.

FIG. 3 illustrates an electron acceleration layer 4a of an electron emitting element 1a which has an arrangement different from that described above. The electron acceleration layer 4a includes a fine particle layer containing the insulating fine particles 5 and the conductive fine particles 6. FIG. 4 illustrates an electron acceleration layer 4b of an electron emitting element 1b which has an arrangement different from that described above. The electron acceleration layer 4b includes a fine particle layer containing the insulating fine particles 5 and a basic dispersant 106.

An electron emission mechanism of the electron emitting element 1 of the present invention is considered to be similar to an operation mechanism of the so-called MIM type electron emitting element in which an insulating layer is inserted between two conductive films. Regarding a mechanism of formation of a current path at the time when an electric field is applied to an insulating layer in the MIM type electron emitting element, various explanations are provided as a general explanation. Examples of such explanations are: (a) diffusion of an electrode material into an insulating layer; (b) crystallization of the insulating material; (c) formation of a conductive path called filament; (d) variation in the insulating material in terms of stoichiometry; and (e) trapping of electrons due to a defect in the insulating material and an intense electric field region locally formed by the trapped electrons. However, the mechanism has not been determined yet. In any explanation, according to the above arrangement, the electrons are considered to be emitted to the outside of the element by (i) formation of the current path at the time when an electric field is applied to the electron acceleration layer 4 made of a fine particle layer that includes insulating fine particles 5 and that corresponds to an insulating layer, (ii) generation of ballistic electrons as a result of accelerating, by the electric field, a part of electrons in the current, and (iii) transmission of the ballistic electrons through the thin-film electrode 3 that is one of the electrode substrate 2 and the thin-film electrode 3 that correspond to two conductive films.

In the electron acceleration layers 4a and 4b whose fine particle layer includes at least one of (i) the conductive fine particles 6 and (ii) the basic dispersant 106, it is considered that a mechanism of formation of a current path at the time when an electric field is applied to the electron acceleration layers 4a and 4b is as follows.

The electron acceleration layer 4a containing the conductive fine particles 6 is a thin-film layer in which the insulating fine particles 5 and the conductive fine particles 6 are densely assembled and has a semi-conductive property. Application of a voltage to such a semi-conductive electron acceleration layer 4a causes current to flow in the electron acceleration layer 4a, and causes a part of electrons in the current to be emitted, as ballistic electrons, due to an intense electric field formed by the applied voltage.

Meanwhile, although a mechanism of electron emission in the electron acceleration layer 4b containing the basic dispersant 106 has not been determined yet, application of a voltage between the electrode substrate 2 and the thin-film electrode 3 causes current to flow in the electron acceleration layer 4b, and causes a part of electrons in the current to be emitted from a thin-film electrode 3 side, as ballistic electrons, due to an intense electric field formed by the applied voltage. Here, it is considered that an electron pair donor that donates a pair of electrons, included in the basic dispersant 106, causes electrons to be emitted from the electron emitting element 1b. That is, the basic dispersant includes the electron pair donor that donates a pair of electrons, and the electron pair donor is ionized after donating the pair of electrons. It is considered that the ionized electron pair donor transfers electric charge on a surface of the insulating fine particle to which the electron pair donor is attached, thereby allowing electric conduction on the surface of the insulating fine particle 5.

The following description deals with arrangements of the respective electron acceleration layers 4, 4a, and 4b.

(Electron Acceleration Layer: Part 1)

As illustrated in FIG. 2, the electron acceleration layer 4 includes a fine particle layer containing the insulating fine particles 5.

A material of the insulating fine particles 5 is not limited in particular as long as the material has an insulating property. For example, $SiO_2$, $Al_2O_3$, and $TiO_2$ are practically used. However, in a case where surface-treated silica particles having a small particle diameter are used, a surface area of the surface-treated silica particles is increased in a solvent and viscosity of the solvent increases as compared to a case where spherical silica particles having a particle diameter larger than that of the surface-treated silica particles are used. As a result, a thickness of the electron acceleration layer 4 tends to increase slightly. Further, fine particles made of an organic polymer can be used as the material of the insulating fine particles 5. Examples of such fine particles made of an organic polymer are cross-linked fine particles (SX 8743) made of stylene/divinylbenzene manufactured and marketed by JSR Corporation, or Fine Sphere series which are styrene acryl fine particles manufactured and marketed by NIPPON PAINT Co., Ltd. Further, particles that may be used as the insulating fine particles 5 include (i) two or more different kinds of particles, (ii) particles having different peaks in diameter, or (iii) one kind of particles whose distribution of diameters is broad.

In a case where the electron acceleration layer 4 contains the insulating fine particles 5, but contains no conductive fine particle, the insulating fine particles 5 have an average particle diameter preferably in a range of 7 nm to 400 nm. As explained later, a layer thickness of the electron acceleration layer 4 is preferably 1000 nm or less. However, when the average particle diameter of the insulating fine particles 5 becomes greater than 400 nm, it becomes difficult to control the layer thickness of the electron acceleration layer 4 so that the layer thickness becomes appropriate. Accordingly, the average particle diameter of the insulating fine particles 5 is preferably in the above range. In this case, distribution of the respective particle diameters may be broad with respect to the average particle diameter. For example, the respective particle diameters of the fine particles having an average particle diameter of 50 nm may be distributed in a range of 20 nm to 100 nm.

The insulating fine particles 5 may be surface-treated. The insulating fine particles 5 here may be surface-treated with silanol or a silyl group. In production of the electron acceleration layer 4, when the insulting fine particles 5 are applied to the electrode substrate after the insulating fine particles 5 are dispersed in an organic solvent, dispersibility of the organic solvent improves in a case where respective particle surfaces are treated with silanol or a silyl group. As a result, it becomes easy to obtain the electron acceleration layer 4 in which the insulating fine particles 5 are evenly dispersed. Further, by dispersing the insulating fine particles 5 evenly, it becomes possible to form an electron acceleration layer that has a small layer thickness and a high surface smoothness. As a result, the thin-film electrode 3 on the electron acceleration layer 4 can be formed thinly. As described above, the thinner the film thickness of the thin-film electrode 3 which can ensure electric conductivity becomes, the more efficiently the electrons can be emitted.

A layer thickness of the electron acceleration layer 4 is not less than an average particle diameter of the insulating fine particles and preferably 1000 nm or less. The smaller the layer thickness of the electron acceleration layer 4 becomes, the more easily the current flows. However, the layer thickness is the smallest when the insulating fine particles 5 of the electron acceleration layer 4 are evenly placed as one layer on the electrode substrate so that the insulating fine particles 5 do not overlap with each other (each insulating fine particle 5 is not provided on top of another). Therefore, the minimum layer thickness of the electron acceleration layer 4 is an average particle diameter of the insulating fine particles 5 forming the electron acceleration layer 4. A case where the layer thickness of the electron acceleration layer 4 is smaller than the average particle diameter of the insulating fine particles 5 means a state in which the electron acceleration layer 4 includes a section where the insulating fine particles 5 is not present. In such a case, the electron acceleration layer 4 does not function as an electron acceleration layer. Therefore, the average particle diameter is preferable as the lowest limit value of the layer thickness of the electron acceleration layer 4. The lowest limit value of the layer thickness of the electron acceleration layer 4 is considered to be more preferably a layer thickness in a case where two or more insulating fine particles 5 are accumulated. This is because, in a case where the electron acceleration layer 4 has the layer thickness equal to a diameter of one constituent particle, leak current increases though an amount of current flowing in the electron acceleration layer 4 increases. This weakens the intensity of the electric field exerted on the electron acceleration layer 4. As a result, electrons cannot be emitted efficiently. Meanwhile, in a case where the layer thickness is more than 1000 nm, a resistance of the electron acceleration layer 4 increases and a sufficient current does not flow. As a result, a sufficient amount of electrons cannot be emitted.

Note that, though the layer thickness of the electron acceleration layer 4 is controlled by the particle diameter of the insulating fine particles 5 and a concentration (viscosity) of a dispersion solution in which the insulating fine particles 5 are dispersed in a solvent, the layer thickness is greatly influenced particularly by the concentration.

The following description deals with an electron emission mechanism of the electron emitting element which includes the electron acceleration layer 4 including no conductive fine particles, with reference to FIG. 2. Though the electron emission mechanism of the electron emitting element 1 is not clearly determined, the following explanation is possible by using an explanation (e) among five explanations (a) to (e) on a mechanism of formation of a conductive path as explained above. That is, when a voltage is applied between the electrode substrate 2 and the thin-film electrode 3, electrons move to respective surfaces of the insulating fine particles 5 from the electrode substrate 2. Because the inside of each of the insulating fine particles 5 has a high resistance, the electrons are conducted on the surface of the insulating fine particles 5. During the conduction, the electrons are trapped in an impurity on the surface of the insulating fine particles 5 or an oxygen-depleted section that occurs in a case where the insulating fine particles 5 are oxide, or at a contact between the insulating fine particles 5. The electrons trapped as described above work as fixed electric charge. As a result, an intense electric field region is produced locally in the vicinity of the thin-film electrode 3 of the electron acceleration layer 4 due to a combination of electric fields formed by an applied voltage and the electrons trapped. Due to the intense electric field, the electrons are accelerated. Consequently, the electrons are emitted from the thin-film electrode 3.

The following description deals with one embodiment of a method for forming the electron emitting element 1 which includes the electron acceleration layer 4 which contains such insulating fine particles 5, but contains no conductive fine particle. First, an insulating fine particles dispersion solution A in which the insulating fine particles 5 are dispersed in a solvent is obtained. The solvent that is used here is not specifically limited as long as the insulating fine particles 5 are dispersed in the solvent and dried after application of the dispersion solution. Examples of such a solvent are toluene, benzene, xylene, hexane, methanol, ethanol, and propanol.

Then, the insulating fine particles dispersion solution A prepared as described above is applied on the electrode substrate 2 by using a spin coating method so as to form the electron acceleration layer 4. By repeating the formation by the spin coating method and drying a plurality of times, a predetermined layer thickness can be obtained. The electron acceleration layer 4 can be formed by, for example, a dropping method or a spray coating method, other than the spin coating method.

After the formation of the electron acceleration layer 4, the thin-film electrode 3 is formed on the electron acceleration layer 4. For formation of the thin-film electrode 3, for example, a magnetron sputtering method may be used. Alternatively, the thin-film electrode 3 can be formed by, for example, an ink-jet method, a spin coating method, or a vapor deposition method.

(Electron Acceleration Layer: Part 2)

FIG. 3 is a schematic view illustrating, as another embodiment of an electron emitting element of the present invention, the electron acceleration layer 4a which contains the insulating fine particles 5 and the conductive fine particles 6.

As a constituent material of the conductive fine particles 6, any conductor can be used from the viewpoint of the operation principle of generating ballistic electrons. A conductor having high resistance to oxidation can avoid oxidation degradation at the time of an operation under the atmospheric pressure. The high resistance to oxidation indicates that an oxide formation reaction is low. In general, according to a thermodynamic calculation, when a value of a change $\Delta G$ [kJ/mol] in free energy of oxide formation is negative and greater, the oxide formation reaction occurs more easily. According to the present invention, metal elements which satisfy $\Delta G > -450$ [kJ/mol] are conductive fine particles having high resistance to oxidation. Moreover, the conductive fine particles having high resistance to oxidation may be conductive fine particles in which the oxide formation reaction is made more difficult to occur by causing insulating materials smaller than the conductive fine particles to be attached or coat the conductive fine particles made of the metal elements. In a case where the conductive fine particles are conductive fine particles having high resistance to oxidation, it is possible to prevent deterioration of the element, such as oxidation of the conductive fine particles due to oxygen in the atmosphere. This allows an increase in life of the electron emitting element.

Examples of the conductive fine particles having high resistance to oxidation include noble metals such as gold, silver, platinum, and nickel. The conductive fine particles 6 can be produced by using a known fine particle production method such as a sputtering method or a spray heating method. It is also possible to use commercially available metal fine particle powder such as silver nanoparticles manufactured and marketed by Applied Nanoparticle Laboratory Co. The principle of generating ballistic electrons is described later.

Here, the conductive fine particles 6 have an average particle diameter more preferably in a range of 3 nm to 10 nm. In a case where the conductive fine particles 6 have an average particle diameter preferably in a range of 3 nm to 10 nm, a conductive path due to the conductive fine particles 6 is not formed in the electron acceleration layer 4a. This makes it difficult for dielectric breakdown to occur in the electron acceleration layer 4a. The use of the conductive fine particles 6 having an average particle diameter of above range allows efficient generation of the ballistic electrons, although a principle of such efficient generation of the ballistic electrons has not been determined yet.

A ratio of the conductive fine particles 6 to the whole of the electron acceleration layer 4a preferably falls in a range from 0.5% by weight to 30% by weight. In a case where such a ratio is smaller than 0.5% by weight, the conductive fine particles 6 cannot produce an effect of increasing current in the element. In a case where such a ratio is larger than 30% by weight, aggregation of the conductive fine particles occurs. The ratio of the conductive fine particles 6 to the whole of the electron acceleration layer 4a more preferably falls in a range from 1% by weight to 10% by weight.

Note that a conductive fine particle 6 may be surrounded by a small insulating substance that is an insulating substance whose size is smaller than the average the conductive fine particle 6. This small insulating substance can be an adhering substance which adheres to a surface of the conductive fine particle 6. Further, the adhering substance may be an insulating coating film that coats the surface of the conductive fine particle 6 and that is made as an aggregate of particles whose average particle diameter is smaller than that of the conductive fine particle 6. In view of the operation principle for generating ballistic electrons, any insulating material can be used as the small insulating substance. However, in a case where the insulating substance whose size is smaller than that of the conductive fine particle 6 is the insulating coating film coating the surface of the conductive fine particle 6 and an oxide film of the conductive fine particle 6 is used as the insulating coating film, a thickness of the oxide film may be increased to a thickness larger than a desired thickness due to oxidation degradation in the atmosphere. For the purpose of preventing the oxidation degradation at the time of an operation under the atmospheric pressure, the insulating coating film is preferably made of an organic material. Examples of the organic material include: alcoholate, aliphatic acid, and alkanethiol. A thinner insulating coating film is more advantageous.

The conductive fine particles 6 are preferably surface-treated so that dispersibility of a dispersion solution of the conductive fine particles 6 is improved in the production method later described. The conductive fine particles 6 may be surface-treated by coating the surfaces of the conductive fine particles 6 with the insulating coating film.

A material of the insulating fine particles 5 is similar to that described in "Electron Acceleration Layer: Part 1". Note, however, that the insulating fine particles 5 have an average particle diameter more preferably in a range of 10 nm to 1000 nm, further more preferably in a range of 12 nm to 110 nm.

In a case where a voltage applied between the electrode substrate 2 and the thin-film electrode 3 is constant, the thinner the electron acceleration layer 4a is, the more intense the electric field becomes. That is, by forming the electron acceleration layer 4a to have a thin thickness, it is possible to accelerate electrons by applying an intense electric field while a voltage applied between the electrode substrate 2 and the thin-film electrode 3 is maintained low. On the other hand, the electron acceleration layer 4a preferably has a predetermined layer thickness or larger because a layer thickness of the electron acceleration layer 4a should be made even, and further resistance of the electron acceleration layer 4a in a layer thickness direction should be controllable. In view of this, it is preferable that the electron acceleration layer 4a have a thickness in a range of 12 nm to 6000 nm, and more preferably 300 nm to 6000 nm.

In a case where the electron acceleration layer 4a contains the conductive fine particles 6, the conductive fine particles 6 allow improvement in electric conduction on the surfaces of the insulating fine particles 5. This makes it easy to control conductivity of the element.

The following description deals with a principle of electron emission of the electron emission element 1a which includes the electron acceleration layer 4a, with reference to FIG. 3.

As illustrated in FIG. 3, the fine particle layer constituting the electron acceleration layer 4a, is made mostly of the insulating fine particles 5, and the conductive fine particles 6 are located in gaps between the insulating fine particles 5. In FIG. 3, a ratio of weight of the insulating fine particles 5 to total weight of the insulating fine particles 5 and the conductive fine particles 6 is 80%.

The electron acceleration layer 4a has a semi-conductive property since the electron acceleration layer 4a is constituted by the insulating fine particles 5 and a small amount of conductive fine particles 6. Therefore, a voltage application to the electron acceleration layer 4a causes very weak current flow. A volt-ampere characteristic of the electron acceleration layer 4a shows a so-called varistor characteristic, and a current value sharply increases as an applied voltage increases. A part of electrons in the current become ballistic electrons due to an intense electric field formed within the electron acceleration layer 4a by the applied voltage. The ballistic electrons are caused to transmit through the thin-film electrode 3 or pass through gaps in the thin-film electrode 3 and are emitted to the outside of the electron emitting element 1a. A generation process of the ballistic electrons has not been determined, but it is considered that the ballistic electrons are generated by simultaneous acceleration and tunneling of electrons in a direction of an electric field.

The following description deals with one embodiment of a method for producing the electron emitting element 1a which enables the conductive fine particles 6 to cause electric conduction on the surfaces of the insulating fine particles 5. First, a fine particles dispersion solution B in which the insulating fine particles 5 and the conductive fine particles 6 are dispersed is obtained. Here, a solvent that is used in the fine particles dispersion solution B is not specifically limited as long as the insulating fine particles 5 and the conductive fine particles 6 are dispersed in the solvent and dried after application of the dispersion solution. Examples of such a solvent are: toluene, benzene, xylene, hexane, and tetradecane. The conductive fine particles 6 are preferably subjected to alcoholate treatment in advance in order that dispersibility of the conductive fine particles 6 is improved.

Then, the fine particles dispersion solution B prepared as described above is applied on the electrode substrate 2 by using a spin coating method so as to form the electron acceleration layer 4a. By repeating the film formation by the spin coating method and drying a plurality of times, a predetermined layer thickness can be obtained. The electron acceleration layer 4a can be formed by, for example, a dropping method or a spray coating method, other than the spin coating method. Note that the above method for producing the electron acceleration layer is merely one embodiment, and that the electron emitting element 1a may be produced by using other methods such as a method in which conductive fine particles are added on an insulating fine particle layer.

After the formation of the electron acceleration layer 4a, the thin-film electrode 3 is formed on the electron acceleration layer 4a. Note that the thin-film electrode 3 is formed in a similar manner to that described above.

(Electron Acceleration Layer: Part 3)

FIG. 4 is a schematic view illustrating, as further another embodiment of the electron acceleration layer of the present invention, the electron acceleration layer 4b which contains the insulating fine particles 5 and the basic dispersant 106.

The basic dispersant 106 is for preventing cohesion of the insulating fine particles 5 in a solvent and causing the insulating fine particles 5 to be dispersed in the solvent. However, the basic dispersant 6 has the following functions: (i) a primary function as a dispersant that successfully disperses, in a solvent, the insulating fine particles 5 that easily cohere to one another, thereby realizing formation of a very smooth fine particle layer on a surface of the electrode substrate 2; and (ii) an additional function that allows electrical conduction on surfaces of the insulating fine particles 5.

The basic dispersant 106 includes a polymer and an electron pair donor that is introduced into a part of the polymer. The polymer provides dispersibility due to its steric repulsion effect. In FIG. 4, a referential numeral 15 indicates a region where a steric hindrance formed between the insulating fine particles 5 is caused. The electron pair donor functions as an anchor that adsorbs to the insulating fine particle 5. Further, after donating a pair of electrons, the electron pair donor becomes a positive ion, thereby allowing ion conduction. It is presumed that the function that allows electric conduction on the surfaces of the insulating fine particles 5 is caused because a part, in the basic dispersant 106, that allows the ion conduction transfers electric charge. Further, the ion conductive parts in the basic dispersant 106 electrically repulse one another, thereby contributing to the dispersion of the insulating fine particles.

An electron pair donating part is a specific substituent having an electron donating substituent, which may be, for example, a pi electron system, such as a phenyl group or a vinyl group, an alkyl group, an amino group, or the like.

Examples of commercially available products of the basic dispersant 106 that can be applied to the present invention encompass: products manufactured by Avecia K.K. (SOLSPERSE disperses, such as SOLSPERSE 9000, 13240, 13940, 20000, 24000, 24000GR, 24000SC, 26000, 28000, 32550, 34750, 31845, and the like); products manufactured by BYK chemie (DISPERBYK 106, 112, 116, 142, 161, 162, 163, 164, 165, 166, 181, 182, 183, 184, 185, 191, 2000, 2001); products manufactured by Ajinomoto Fine-Techno Co., Inc. (AJISPER PB711, PB411, PB111, PB821, PB822); and products manufactured by EFKA chemicals (EFKA-47, 4050). A content of the basic dispersant 106 in the electron acceleration layer 4b is an important control factor, in terms of controlling an amount of electrons emitted, because the content relates to easiness in flow of current in the electron emitting element 1b, which is correlated with the amount of electrons emitted.

Addition of the basic dispersant 106 to the electron acceleration layer 4b is carried out in course of dispersing, in a solvent, the insulating fine particles 5 to form the electron acceleration layer 4b. That is, a necessary amount of the basic dispersant 106 is added to a solvent to be used and then dispersed in the solvent, so as to prepare a dispersant-containing solvent. Subsequently, the insulating fine particles 5 are added to the dispersant-containing solvent and then sufficiently dispersed in the dispersant-containing solvent so that the basic dispersant 106 adheres to the surfaces of the insulating fine particles 5. An amount of the dispersant adhering to the surfaces of the insulating fine particles 5 can be controlled by controlling an additive amount of the dispersant added to the solvent. However, the additive amount of the dispersant is not proportional to easiness in current flow in the electron acceleration layer 4b, which is obtained after the dispersant is added. That is, the easiness in current flow has a peak at a point when the additive amount of the dispersant reaches a certain amount. In a case where the additive amount is insufficient, the number of electron carriers is insufficient, thereby resulting in that an amount of current flowing in the electron acceleration layer 4b is naturally small. On the other hand, in a case where the additive amount is excessive, a component of the polymer included in the basic dispersant intensely works as a resistive component with respect to the current flowing in the element, thereby reducing a current value.

As such, there is an optimal value in the additive amount of the basic dispersant 106. The optimal value is set in view of the amount of current flowing in the element, and therefore depends on the situation. However, under conditions for forming, by the spin-coating method, the electron acceleration layer 4b by dropping a dispersion solution in which the insulating fine particles 5 are dispersed, the basic dispersant 106 is contained in the solvent preferably by 0.4 wt % to 10 wt %, and more preferably by 1 wt % to 5 wt %.

In a case where the basic dispersant 106 is contained in the solvent by less than 0.4 wt %, a sufficient amount of current flowing in the electron acceleration layer 4b cannot be obtained, thereby resulting in that the electron emitting element 1 may not emit electrons at all. In a case where the basic dispersant 106 is contained more preferably by not less than 1 wt %, it is possible to obtain stable electron emission from the electron emitting element. On the other hand, in a case where the basic dispersant 106 is contained by more than 10%, a resistive component of the polymer included in the basic dispersant 106 may cause the current in the element to be difficult to flow. This may cause decrease in electron emission from the electron emitting element. In a case where the basic dispersant 106 is contained more preferably by not more than 5 wt %, it is advantageously possible to obtain electron emission from the electron emitting element 1b without any decrease in the amount of the electrons emitted.

A material and the like of the insulating fine particles 5 are similar to those described in "Electron Acceleration Layer: Part 1". However, in an arrangement in which the basic dispersant 106 is included, the insulating fine particles 5 have an average particle diameter more preferably in a range of 10 nm to 1000 nm, and further more preferably in a range of 12 nm to 110 nm.

In a case where a voltage applied between the electrode substrate 2 and the thin-film electrode 3 is constant, the thinner the electron acceleration layer 4b is, the more intense the electric field becomes. That is, by forming the electron acceleration layer 4b to have a thin thickness, it is possible to accelerate electrons by applying an intense electric field while a voltage applied between the electrode substrate 2 and the thin-film electrode 3 is maintained low. On the other hand, the electron acceleration layer 4b preferably has a predetermined layer thickness or larger because a layer thickness of the electron acceleration layer 4b should be made even, and further resistance of the electron acceleration layer 4b in a layer thickness direction should be controllable. In view of this, it is preferable that the electron acceleration layer 4b have a thickness in a range of 12 nm to 6000 nm, and more preferably 300 nm to 6000 nm.

With reference to FIG. 4, the following description deals with a principle of electron emission of the electron emitting element 1b which allows the basic dispersant 106 to cause electric conduction on the surfaces of the insulating fine particles 5.

As illustrated in FIG. 4, the electron acceleration layer 4b is made mostly of the insulating fine particles 5, and the basic dispersant 106 adheres to the surfaces of the insulating fine particles 5. This forms a region 15 where a steric hindrance is caused due to the basic dispersant 106 is formed on the surface of the insulating fine particle 5, thereby allowing the insulating fine particles 5 to be successfully dispersed in the solvent. Further, the insulating fine particles 5 have an insulation property. However, an ion conductive part of the basic dispersant 106 adhering to the surface of the insulating fine particle 5 transfers electric charge, thereby resulting in that the electron acceleration layer 4b has a semi-conductive property. Therefore, a voltage application to the electron acceleration layer 4 causes very weak current flow. A volt-ampere characteristic of the electron acceleration layer 4b shows a so-called varistor characteristic, and a current value sharply increases as an applied voltage increases. A part of electrons in the current become ballistic electrons due to an intense electric field formed within the electron acceleration layer 4b by the applied voltage. The ballistic electrons are caused to pass (transmit) through the thin-film electrode 3 and are emitted to the outside of the electron emitting element 1b, or are emitted from holes (gaps) in the thin-film electrode 3. A generation process of the ballistic electrons has not been determined, but it is considered that the ballistic electrons are generated by simultaneous acceleration and tunneling of electrons in a direction of an electric field.

The following description deals with one embodiment of a method for producing the electron emitting element 1b which allows the basic dispersant 106 to cause electric conduction on the surfaces of the insulating fine particles 5. Initially, the basic dispersant 106 is poured into a dispersion solvent, and the dispersion solvent is set in an ultrasonic dispersion device so that the basic dispersant 106 is dispersed in the solvent. Then, insulating fine particles 5 are poured therein and further set in the ultrasonic dispersion device so that the insulating fine particles 5 are dispersed in the solvent. Thus, an insulating fine particle dispersion solution C is prepared. A dispersing method thereof is not limited in any particular manner, and the basic dispersant 106 and the insulating fine particles 5 may be dispersed by a method other than the method using the ultrasonic dispersion device.

The dispersion solvent is not particularly limited provided that the dispersion solvent is compatible with the basic dispersant 106, allows the insulating fine particles 5 to be effectively dispersed therein, and further evaporates after the dispersion solvent is applied. For example, toluene, benzene, xylene, hexane, tetradecane, and the like can be used as the dispersion solvent.

The insulating fine particle dispersion solution C thus prepared is applied to the electrode substrate 2, so as to form the electron acceleration layer 4b. An application method thereof may be, for example, a spin-coating method. That is, the insulating fine particle dispersion solution C is dropped onto the electrode substrate 2 and forms a thin film as the electron acceleration layer 4b by use of the spin-coating method. The successive processes of dropping the insulating fine particle dispersion solution C, forming a film by the spin-coating method, and drying the film are repeatedly carried out several times so as to form a film having a predetermined thickness. The formation of the electron acceleration layer 4b can be also carried out by a drop method, a spray-coating method, or the like, besides the spin-coating method. Note that the above producing method of the electron acceleration layer is merely one embodiment, and that the electron acceleration layer may be produced by other methods such as a method in which a basic dispersant is added onto an insulating fine particle layer.

After the electron acceleration layer 4b is formed as such, the thin-film electrode 3 is formed on the electron acceleration layer 4b. Note that the thin-film electrode 3 is formed in a similar manner to that described above.

According to the electron emitting element 1 arranged as above, a change in parameters such as a layer thickness of the electron acceleration layer and a shape of the thin-film electrode changes a resistance value of the electron acceleration layer 4 and an amount of ballistic electrons to be generated, as described above. Further, according to the electron emitting element 1a, a change in parameters such as a shape of the thin-film electrode, and material, particle diameter, and additive amount of the conductive fine particles 6 changes a resistance value of the electron acceleration layer 4a and an amount of ballistic electrons to be generated. Further, according to the electron emitting element 1b, a change in parameters such as a shape of the thin-film electrode, and type and additive amount of the basic dispersant 106 changes a resistance value of the electron acceleration layer 4b and an amount of ballistic electrons to be generated. The increased number of parameters makes it possible to more easily adjust a resistance value of an electron acceleration layer and an amount of ballistic electrons to be generated.

Therefore, adjusting the resistance value of the electron acceleration layer 4, 4a or 4b and an amount of generated ballistic electron by changing these various parameters makes it possible to control a value of current flowing in the electron acceleration layer 4, 4a or 4b and an amount of electrons to be emitted. Moreover, it is possible to prevent the electron emitting element 1 from being broken down due to heat because the insulating fine particle 5 also has a function to efficiently release Joule heat caused by the current flowing in the electron acceleration layer 4, 4a, or 4b.

According to the arrangements, the electron emitting elements 1, 1a, and 1b are capable of controlling values of current flowing through electron acceleration layers 4, 4a, and 4b and amounts of emitted electrons, respectively.

According to the electron emitting element 1, 1a, and 1b, $$Ie = \alpha \cdot R^{-0.67} \qquad \text{equation (1)}$$

where Ie [A/cm$^2$] is electron emission current per unit area during voltage application and R is element resistance [Ω·cm$^2$] per unit area, the element resistance being obtained by dividing (a) the voltage applied between the electrode substrate 2 and the thin-film electrode 3 during the voltage application by (b) current in element per unit area which current flows between the electrode substrate 2 and the thin-film electrode 3 during the voltage application, and where α is not less than $2.0 \times 10^{-6}$, and the electron emission current Ie is not less than $1.0 \times 10^{-9}$. The electron emission current Ie per unit area is hereinafter referred to as "electron emission current density Ie".

With the arrangement, it is possible to provide a practical electron emitting element 1 having good energy efficiency.

The following description deals with how the above equation was obtained. As a result of repeated experiments for improvement of element characteristics of the electron emitting elements 1, 1a, and 1b, the inventors of the present invention found that it is possible to provide a practical electron emitting element having good energy efficiency by defining a relationship between (i) the electron emission current density Ie [A/cm$^2$] during the voltage application and (ii) the element resistance R [Ω·cm$^2$] per unit area, the element resistance R being obtained by dividing (a) a voltage applied between the electrode substrate 2 and the thin-film electrode 3 during the voltage application by (b) current per unit area in the element which current flows between the electrode substrate 2 and the thin-film electrode 3 during the voltage application.

Figure 5:
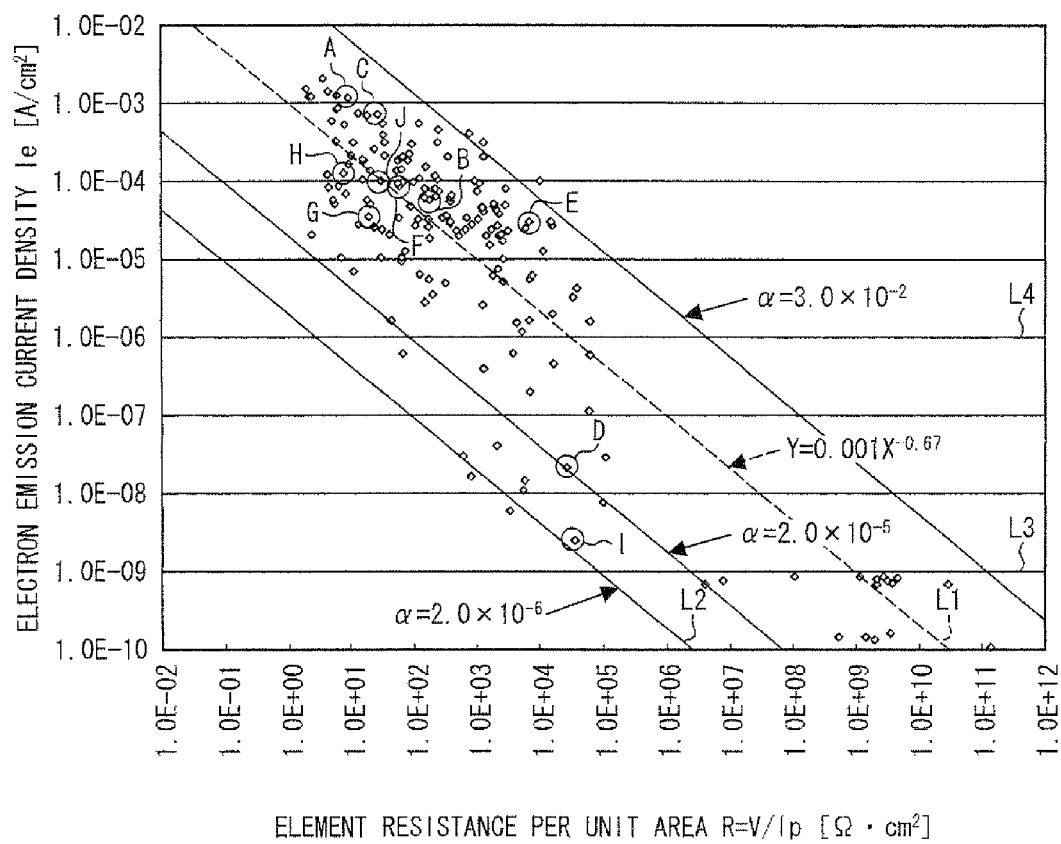
FIG. 5 is a graph showing relationships between electron emission current density Ie and element resistance R which relationships are obtained as a result of electron emission experiments carried out with respect to electron emitting elements produced under various element producing conditions.

As described above, according to the electron emitting elements 1, 1a, and 1b, it is possible to adjust resistance values of the electron acceleration layers 4, 4a, and 4b and an amount of generated ballistic electrons by changing various parameters such as a particle diameter (average particle diameter) of the insulating fine particle 5, a layer thickness of the electron acceleration layers 4, 4a, and 4b (the number of accumulated insulating fine particles), a ratio of the conductive fine particles 6 or the basic dispersant 106 added to the insulating fine particles 5, and a shape of the thin-film electrode 3. FIG. 5 shows a graph in which electron emission current densities Ie of various electron emitting elements 1 obtained by changing such element forming conditions (parameters) are plotted, where a horizontal axis indicates the element resistance R.

In the graph of FIG. 5, small element resistance R during the voltage application means that current in the element is large. This means that power consumed in the element is large and that an amount of electrons emitted to the outside of the element is small. In contrast, large element resistance R during the voltage application means that current in the element is small. This means that power consumed in the element is small and that an amount of electrons emitted to the outside of the element is increased. Therefore, an electron emitting element which has large resistance R and large electron emission current density Ie during the voltage application is an element which has high energy efficiency.

As is clear from the graph of FIG. 5, the electron emission current density Ie in the electron emitting element 1 in which electron emission was confirmed becomes larger as the resistance R in the element becomes smaller, whereas the electron emission current density Ie becomes smaller as the resistance R becomes larger. Further, the largest concentration of points can be found in a range from $1.0 \times 10^0$ to $1.0 \times 10^5$. Furthermore, the points indicative of the relationship between (i) the electron emission current density Ie during the voltage application and (ii) the element resistance R per unit area are located in a stripe along a broken straight line L1 expressed by Ie=α·R$^{-0.67}$. Here, the straight line L1 shifts rightward as the coefficient α becomes larger.

Based on the graph of FIG. 5, the inventors of the present invention defined, as a practical electron emitting element 1 having good energy efficiency, an electron emitting element in which Ie=α·R$^{-0.67}$, where α is not less than $2.0 \times 10^{-6}$, and Ie is not less than $1.0 \times 10^{-9}$.

This requires points indicative of the relationship to be located in an overlapping part of (i) a region of a larger element resistance R side of the line L2 which region includes the line L2 and (ii) a region of a larger electron emission current density Ie side of the line L3 which region includes the line L3.

In a case where it is desired that the electron emitting element 1 have a property of uniform electron emission in a planar direction, it is preferable that a condition that the electron emission current density Ie is not less than $1.0 \times 10^{-6}$ be added. This requires points indicative of the relationship to be located in an overlapping part of (i) the region of the larger element resistance R side of the line L2 which region includes the line L2 and (ii) a region of a larger electron emission current density Ie side of the line L4 which region includes the line L4.

In a case where the electron emission current density Ie is smaller than $1.0 \times 10^{-6}$ A/cm$^2$, electrons are just locally emitted from a part of a surface of the element, regardless of magnitude of a voltage applied to the electron emitting element 1. Therefore, electron emission from an entire surface of the element cannot be expected. The application of such an electron emitting element locally emitting electrons to a light emitting display element of an FED structure causes uneven luminance as a luminance defect.

The addition of the condition that the electron emission current density Ie is not less than $1.0 \times 10^{-6}$ allows the electron emitting element 1 to be properly used in a light emitting device.

According to the electron emitting element 1 which includes the electron acceleration layer 4 including a fine particle layer which contains no conductive fine particle 6 and no basic dispersant 106, how easily current flows depends on control factors such as (i) layer thickness of the electron acceleration layer and (ii) a shape of the thin-film electrode 3, as described above. Meanwhile, according to the electron emitting elements 1a which includes the electron acceleration layer 4a including a fine particle layer containing the conductive fine particles 6, how easily current flows depends on (ii) the shape of the thin-film electrode 3 and (iii) a material, particle diameter, additive amount of the conductive fine particles 6 which is an additive added to the insulating fine particles 5 in the electron acceleration layer 4a. Similarly, according to the electron emitting layer 4b including a fine particle layer containing the basic dispersant 106, how easily current flows depends on (ii) the shape of the thin-film electrode 3 and (iii) type and amount of the basic dispersant 106 which is an additive added to the insulating fine particles 5 in the electron acceleration layer 4b. The control factors and the element resistance R [Ω·cm$^2$] have the following relationship.

The following description deals with (i) layer thickness of the electron acceleration layer 4. An electron emission characteristic of the electron emitting element 1 can be controlled by controlling the average particle diameter of the insulating fine particles 5 and/or the number of accumulated insulating fine particles 5 (layer thickness of the electron acceleration layer 4).

The following description deals with (ii) the shape of the thin-film electrode 3. Regarding a mechanism of formation of a current path at the time when an electric field is applied to an insulating layer in the MIM type electron emitting element, various explanations are provided as a general explanation. Examples of such explanations are: (a) diffusion of an electrode material into an insulating layer; (b) crystallization of the insulating material; (c) formation of a conductive path called filament; (d) variation in the insulating material in terms of stoichiometry; and (e) trapping of electrons due to a defect in the insulating material and an intense electric field region locally formed by the trapped electrons. However, the current path is accidentally grown. In any explanation, the current path is formed first in an intense electric field region. Therefore, providing a large number of intense electric filed regions in the fine particle layer allows the current path to be formed not accidentally but surely. Specifically, an electric field formed, by the thin-film electrode 3, towards the electrode substrate 2 which is a plane electrode causes an intense electric filed to be formed on an edge section of the thin-film electrode 3. Accordingly, the current path tends to be formed on the edge section first. However, in a case where the current path is not formed on the edge section for some reason, the current path is not formed until dielectric breakdown occurs. In order to prevent this, the thin-film electrode 3 is formed so as not to be completely plane, but is formed as a comb-shaped electrode so that a plurality of edge sections are obtained or as a porous electrode having a plurality of holes. This increases the number of opportunities of current path formation, thereby allowing a current path to be surely formed. As a result, an electron emitting element having good reproducibility can be obtained.

The following description deals with (iii) the additive added to the insulating fine particles 5. Since the insulating fine particle 5 itself has extremely high resistance, current which causes no dielectric breakdown is difficult to stably flow in the insulating fine particle 5. However, addition of an electrically conductive substance to a surface of the insulating fine particle 5 easily allows surface conduction of the insulating fine particle 5. Such a substance may be the conductive fine particle 6 or may be the basic dispersant 106. In a case where the conductive fine particle 6 which has a particle diameter smaller than that of the insulating fine particle 5 is added to the fine particle layer in a certain ratio, current easily flows through a conductive path formed by the conductive fine particle 6. Further, in a case where the basic dispersant 106 is added to the surface of the insulating fine particle 5, an electron pair donor easily allows electric conduction on the surface of the insulating fine particle 5. The addition of such additives allows easy formation of a current path in the fine particle layer. Thus, electrons can be emitted.

FIG. 5 shows relationship between the element resistance R per unit area and the electron emission current density Ie in the electron emitting elements 1, 1a, and 1b produced under various conditions by changing the control factors. In FIG. 5, the solid lines indicate a case where the coefficient α is $2.0 \times 10^{-6}$ in the equation (1), a case where the coefficient α is $2.0 \times 10^{-5}$ in the equation (1), and a case where the coefficient α is $3.0 \times 10^{-2}$ in the equation (1), respectively.

Example 1

First, 3.0 g of toluene was supplied as a solvent into a 10 mL reagent bottle. Then, 0.50 g of spherical silica fine particles EP-C413 (manufactured by Cabot Corporation), having an average particle diameter of 50 nm were added to the toluene. Subsequently, the reagent bottle was set in an ultrasonic dispersion device so that the silica fine particles serving as the insulating fine particles 5 were dispersed. Subsequently, 0.12 g of silver nanoparticles (average particle diameter: 10 nm (inclusive of a thickness of 1 nm of an alcoholate insulating coating film), manufactured by Applied Nanoparticle Laboratory Co.) were further added as the conductive fine particles 6. Then, the reagent bottle was set in the ultrasonic dispersion device again so that a dispersion solution was obtained. A ratio of the conductive fine particles 6 with respect to a total mass of the added particles was approximately 20%.

Next, the dispersion solution thus obtained was dropped on a 30-mm square SUS (stainless steel) substrate serving as the electrode substrate 2, and then a fine particle layer serving as the electron acceleration layer 4 was formed by a spin coating method the substrate on the condition that the SUS substrate was spun at 3000 rpm for 10 seconds. The fine particle layer has a thickness of 800 nm.

On a surface of the substrate thus processed, the thin-film electrode 3 was formed by using a magnetron sputtering device so that an element of the Example 1 was obtained. Gold was used as a material for forming the thin-film electrode 3. A thickness of the thin-film electrode 3 was 50 nm and an area thereof was 0.014 cm$^2$.

Figure 6:
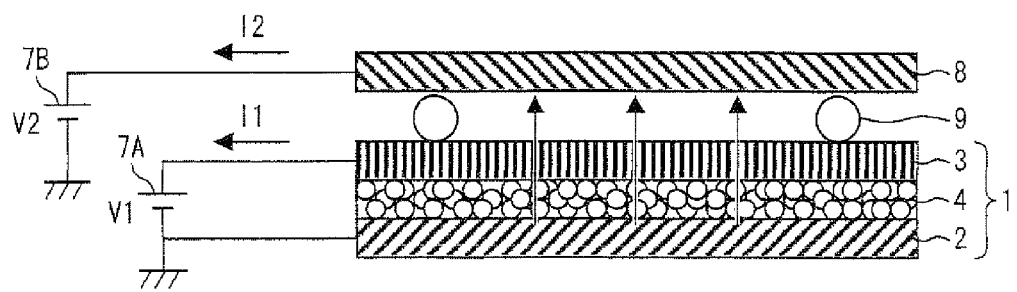
FIG. 6 is an explanatory view illustrating a measurement system used in the electron emission experiments carried out with respect to the electron emitting elements.

An electron emission experiment was carried out with respect to an electron emitting element 1 (sample No. 1) thus produced, by using a measurement system shown in FIG. 6.

FIG. 6 shows the measurement system used in the electron emission experiment. In the measurement system of FIG. 6, a counter electrode 8 was provided on a thin-film electrode 3 side of the electron emitting element 1 so that the counter electrode 8 and the thin-film electrode 3 sandwiched an insulating spacer 9 (diameter: 1 mm). A voltage V1 was applied, by a power supply 7A, between the electrode substrate 2 and the thin-film electrode 3 of the electron emitting element 1, and a voltage V2 was applied, by a power supply 7B, to the counter electrode 8. Current I1 flowing between the thin-film electrode 3 and the power supply 7A was measured as current in element, and current I2 flowing between the counter electrode 8 and the power supply 7B was measured as electron emission current. The electron emission experiment was carried out while the measurement system is being set up in vacuum at $1 \times 10^{-8}$ ATM.

As a result of measuring the electron emission current in vacuum at $1 \times 10^{-8}$ ATM, continuous electron emission current of $1.18 \times 10^{-3}$ A/cm$^2$ per unit area was measured at an applied voltage of 16.3V in the electron emitting element 1 (sample No. 1). That is, electron emission was confirmed. Here, the element resistance R was $9.40 \times 10^0 \Omega \cdot$cm$^2$ (point A in FIG. 5).

Further, an electron emitting element 1 (sample No. 2) was formed under the same condition as above except that a ratio of the conductive fine particles 6 was set to 10%, and an electron emission experiment was carried out by using a measurement system similar to that described above.

As a result of measuring the electron emission current in vacuum at $1 \times 10^{-8}$ ATM, continuous electron emission current of $5.59 \times 10^{-5}$ A/cm$^2$ per unit area was measured at an applied voltage of 19.6V in the electron emitting element 1 (sample No. 2). That is, electron emission was confirmed. Here, the element resistance R was $1.83 \times 10^2 \Omega \cdot$cm$^2$ (point B in FIG. 5).

Example 2

A fine particle dispersion solution in which silica fine particles serving as the insulating fine particles 5 were dispersed was produced as follows. First, 3 mL of toluene was supplied as a solvent into a 10 mL reagent bottle. Then, 0.03 g of AJISPER PB821 (manufactured by Ajinomoto Fine-Techno Co., Inc.) serving as the basic dispersant (basic functional copolymer) 106 was added to the toluene. Subsequently, the reagent bottle was set in an ultrasonic dispersion device so that the AJISPER PB821 was dispersed. After that, 0.25 g of silica particles were added thereto, and the reagent bottle was again set to the ultrasonic dispersion device so that the silica particles were dispersed. The silica particles are fumed silica C413 (manufactured by Cabot Corporation) having a diameter of 50 nm, and surfaces of the silica fine particles are subjected to a hexamethyldisilazane treatment. The reagent bottle was processed in the dispersing device for about 10 minutes, so that the silica particles were dispersed in the toluene solvent so as to become translucent white. Thus, the fine particle dispersion solution was prepared.

Then, a 25 mm square glass substrate on which an ITO thin film was vapor-deposited was prepared as the electrode substrate 2. The fine particle dispersion solution thus prepared was dropped onto a surface of the glass substrate, and then a fine particle layer serving as the electron acceleration layer 4 was formed by use of a spin-coating method. A film-forming condition in the spin-coating method was such that the dispersion solution was dropped onto the surface of the glass substrate while the glass substrate was rotated at 500 RPM for 5 second, and then the glass substrate was rotated at 3000 RPM for 10 seconds. The process was repeated 3 times under the above film-forming condition so that 3 layers of the fine particle layer were deposited on the glass substrate, and then the layers were dried naturally at a room temperature. Thus formed fine particle layer had a thickness of 400 nm.

After the fine particle layer was formed on the surface of the glass substrate, the thin-film electrode 3 was formed by use of a magnetron sputtering device. A material of the thin-film electrode 3 was gold, and the thin-film electrode 3 was formed so as to have a thickness of 50 nm and an area of 0.014 cm$^2$.

An electron emission experiment was carried out with respect to an electron emitting element 1 (sample No. 3) thus produced, by using the measurement system shown in FIG. 6 as in the Example 1.

As a result of measuring the electron emission current in vacuum at $1\times10^{-8}$ ATM, continuous electron emission current of $7.1\times10^{-4}$ A/cm$^2$ per unit area was measured at an applied voltage of 16.3V in the electron emitting element 1 (sample No. 3). That is, electron emission was confirmed. Here, the element resistance R was $2.71\times10^1$ Ω·cm$^2$ (point C in FIG. 5).

Further, an electron emitting element 1 (sample No. 4) was produced under the same condition as above except that an additive amount of the basic dispersant 106 with respect to a solution (the toluene solvent+the basic dispersant) was set to 0.4%, and an electron emission experiment was carried out with respect to the electron emitting element 1 with the use of a measurement system similar to that described above.

Continuous electron emission current of $2.2\times10^{-8}$ A/cm$^2$ per unit area was measured at an applied voltage of 17.9V in the electron emitting element 1 (sample No. 4). Thus, electron emission was confirmed. Here, the element resistance R was $2.73\times10^4$ Ω·cm$^2$ (point D in FIG. 5).

Further, an electron emitting element (sample No. 5) was produced under the same condition as above except that an additive amount of the basic dispersant 106 with respect to the toluene solvent was set to 0.08%, and an electron emission experiment was carried out with respect to the electron emitting element with the use of a measurement system similar to that described above.

However, continuous electron emission was not obtained in the electron emitting element (sample No. 5) although the element resistance R was $1.72\times10^3$ Ω·cm$^2$ at an applied voltage of 15.0V.

Example 3

Into a 10-mL reagent bottle, 2.0 g of an ethanol solvent and 0.5 g of tetramethoxysilane KBM-04 (manufactured by Shin-Etsu Chemical Co., Ltd.) were added. Further, as insulating fine particles 5, 0.5 g of spherical silica particles AEROSIL R8200 (manufactured by Evonik Degussa Japan Co., Ltd.) having an average diameter of 12 nm were added to the reagent bottle, and the reagent bottle was set in an ultrasonic dispersion device, so that a fine particle dispersion solution was prepared.

Next, the fine particle dispersion solution thus prepared was dropped on a 30-mm square SUS substrate serving as the electrode substrate 2, and then a fine particle layer was formed by a spin coating method on the condition that the SUS substrate was spun at 3000 rpm for 10 seconds. The fine particle layer had a thickness of 1600 nm. After the fine particle layer was formed on the surface of the SUS substrate, the thin-film electrode 3 was formed by use of a magnetron sputtering device. A material of the thin-film electrode 3 was gold, and the thin-film electrode 3 was formed so as to have a thickness of 40 nm and an area of 0.014 cm$^2$.

An electron emission experiment was carried out with respect to an electron emitting element 1 (sample No. 6) thus produced, by using the measurement system shown in FIG. 6 as in the Example 1.

As a result of measuring the electron emission current in vacuum at $1\times10^{-8}$ ATM, continuous electron emission current of $2.94\times10^{-5}$ A/cm$^2$ per unit area was measured in the electron emitting element (sample No. 6) in a case where a voltage applied to the thin-film electrode 3 is 26.0V. That is, electron emission was confirmed. Here, the element resistance R was $7.14\times10^3$ Ω·cm$^2$ (point E in FIG. 5).

Further, an electron emitting element 1 (sample No. 7) whose fine particle layer is thinner than that of the sample No. 6 and whose thin-film electrode 3 is a porous electrode was produced with the use of a fine particle dispersion solution prepared in a similar condition to that described above.

That is, a condition for forming the fine particle layer is different from that described above. The fine particle layer was formed by a spin coating method on the condition that the substrate was spun at 8000 rpm for 10 seconds. Then, the fine particle layer was subjected to annealing treatment in an atmosphere of 150° C. The fine particle layer had a thickness of 810 nm.

Then, into a 10-mL reagent bottle, 4.0 g of ethanol solvent and 0.2 g of spherical silica particles SE-5V (manufactured by Tokuyama Corporation) having an average particle diameter of 8 μm were added. The reagent bottle was then subjected to ultrasonic dispersion for 5 minutes so that a mask particle dispersion solution was obtained. The mask particle dispersion solution was sprayed twice on the fine particle layer by a spin coating method, and then ethanol was dried at a room temperature. The thin-film electrode 3 was formed, by use of a magnetron sputtering device, on a surface of the substrate thus processed, and then mask particles sprayed on the fine particle layer were blown away by air. A material of the thin-film electrode 3 was gold, and the thin-film electrode 3 was formed so as to have a thickness of 50 nm and an area of 0.014 cm$^2$.

An electron emission experiment was carried out with respect to an electron emitting element 1 (sample No. 7) thus produced, by using the measurement system shown in FIG. 6 as in the Example 1.

As a result of measuring the electron emission current in vacuum at $1\times10^{-8}$ ATM, continuous electron emission current of $9.10\times10^{-5}$ A/cm$^2$ per unit area was measured at an applied voltage of 17.5V in the electron emitting element (sample No. 7). That is, electron emission was confirmed. Here, the element resistance R was $5.67 \times 10^1 \Omega \cdot cm^2$ (point F in FIG. 5).

Example 4

First, 1.5 g of hexane solvent was supplied into a 10 mL reagent bottle. Then, 0.25 g of spherical silica fine particles EP-C413 (manufactured by Cabot Corporation), having an average particle diameter of 50 nm were added, as the insulating fine particles 5, to the toluene. Subsequently, the reagent bottle was set in an ultrasonic dispersion device so that the silica fine particles were dispersed. Then, 0.06 g of silver nanoparticles (average particle diameter: 10 nm (inclusive of a thickness of 1 nm of an alcoholate insulating coating film), manufactured by Applied Nanoparticle Laboratory Co.) were further added as the conductive fine particles 6. Then, the reagent bottle was set in the ultrasonic dispersion device again. Under this condition, a ratio of the conductive fine particles 6 with respect to a total mass of the added particles was approximately 20%, as in the electron emitting element 1 (sample No. 1) of the Example 1.

Then, 0.075 g of thermoset silicone resin SR-2411 (manufactured by Shin-Etsu Chemical Co., Ltd.) was further added, and the thermoset silicone resin was stirred with the use of a stirrer so that a fine particle dispersion solution was obtained.

Next, the fine particle dispersion solution thus obtained was dropped on a 25-mm square glass substrate which serves as the electrode substrate 2 and on which an ITO film was formed, and then two layers of fine particles were formed by a spin coating method on the condition that the glass substrate was spun at 3000 rpm for 10 seconds. Immediately after this, the glass substrate was heated by use of a heat plate of 150° C. so that a fine particle layer was obtained. The fine particle layer thus obtained had a thickness of 750 nm.

Then, into a 10-mL reagent bottle, 4.0 g of ethanol solvent and 0.2 g of spherical silica particles SE-5V (manufactured by Tokuyama Corporation) having an average particle diameter of 8 μm were added. The reagent bottle was then subjected to ultrasonic dispersion so that a mask particle dispersion solution was obtained. The mask particle dispersion solution was sprayed twice on the fine particle layer by a spin coating method, and then ethanol was dried at a room temperature.

The thin-film electrode 3 was formed, by use of a magnetron sputtering device, on a surface of the substrate thus processed, and then air was blown against the surface of the substrate so that a porous thin-film electrode was obtained. A material of the thin-film electrode 3 was gold, and the thin-film electrode 3 was formed so as to have a thickness of 50 nm and an area of 0.014 cm².

An electron emission experiment was carried out with respect to an electron emitting element 1 (sample No. 8) thus produced, by using the measurement system shown in FIG. 6 as in the Example 1.

As a result of measuring the electron emission current in vacuum at $1 \times 10^{-8}$ ATM, continuous electron emission current of $3.53 \times 10^{-5}$ A/cm² per unit area was confirmed at an applied voltage of 14.1V in the electron emitting element 1 (sample No. 8). Here, the element resistance R was $2.01 \times 10^1 \Omega \cdot cm^2$ (point G in FIG. 5).

An electron emitting element (sample No. 9) was produced under the same condition as above except that a single fine particle layer was formed by a spin coating method. The fine particle layer of the electron emitting element (sample No. 9) has a thickness of 900 nm.

An electron emission experiment was carried out with respect to an electron emitting element (sample No. 9) thus produced, by using the measurement system shown in FIG. 6 as in the Example 1.

However, in the electron emitting element (sample No. 9), current in element was too large and reached a limit of a measurement device when an applied voltage reached 2V. A measurement result showed that the element resistance was not more than $2.8 \times 10^1 \Omega \cdot cm^2$.

In view of this, an electron emitting element (sample No. 10) was produced under the same condition as above except that (i) a single fine particle layer was formed and (ii) the thin-film electrode 3 was not a porous electrode but a normal flat electrode.

An electron emission experiment was carried out with respect to the electron emitting element (sample No. 10) thus produced, by using the measurement system shown in FIG. 6 as in the Example 1.

As a result of measuring the electron emission current in vacuum at $1 \times 10^{-8}$ ATM, continuous electron emission current of $1.28 \times 10^{-4}$ A/cm² per unit area was measured at an applied voltage of 13.6V in the electron emitting element (sample No. 10). That is, electron emission was confirmed. Here, the element resistance R was $7.98 \times 10^0 \Omega \cdot cm^2$ (point H in FIG. 5).

Example 5

First, 3 mL of toluene solvent was supplied into a 10 mL reagent bottle. Then, 0.5 g of cross-linked polymer fine particles ((SX8743) manufactured by JSR Corporation), having an average particle diameter of 50 nm were added, as the insulating fine particles 5, to the toluene solvent. Subsequently, the reagent bottle was set in an ultrasonic dispersion device so that the cross-linked polymer fine particles were dispersed. Then, 0.055 g of silver nanoparticles (average particle diameter: 10 nm (inclusive of a thickness of 1 nm of an alcoholate insulating coating film), manufactured by Applied Nanoparticle Laboratory Co.) were further added as the conductive fine particles 6. Then, the reagent bottle was set in the ultrasonic dispersion device again so that a fine particle dispersion solution was obtained.

Next, the fine particle dispersion solution thus obtained was dropped on a 30-mm square SUS substrate which serves as the electrode substrate 2, and then a fine particle layer was formed so as to have three layers by a spin coating method on the condition that the SUS substrate was spun at 3000 rpm for 10 seconds. The fine particle layer had a thickness of 400 nm.

The thin-film electrode 3 having a thickness of 40 nm was formed, by use of a magnetron sputtering device, on a surface of the fine particle layer so that an electron emitting element 1 (sample No. 11) was obtained. A material of the thin-film electrode 3 was gold, and the thin-film electrode 3 was formed so as to have a thickness of 50 nm and an area of 0.014 cm².

An electron emission experiment was carried out with respect to the electron emitting element (sample No. 11) thus produced, by using the measurement system shown in FIG. 6 as in the Example 1.

As a result of measuring the electron emission current in vacuum at $1 \times 10^{-8}$ ATM, continuous electron emission current of $2.51 \times 10^{-9}$ A/cm² per unit area was measured at an applied voltage of 19.0V in the electron emitting element 1 (sample No. 11). That is, electron emission was confirmed. Here, the element resistance R was $3.71 \times 10^4 \Omega \cdot cm^2$ (point I in FIG. 5).

Example 6

First, 3 mL of ethanol was supplied as a solvent into a reagent bottle. Then, 0.25 g of silica particles (average particle diameter: 110 nm, specific surface area: 30 m$^2$/g) whose surfaces are subjected to a hexamethyldisilazane (HMDS) treatment were added, as the insulating fine particles 5, to the ethanol solvent. Subsequently, the reagent bottle was set in an ultrasonic dispersion device so that a silica fine particle dispersion solution was obtained.

Then, the silica fine particle dispersion solution thus obtained was dropped onto a 25 mm square SUS substrate serving as the electrode substrate 2 so that the electron acceleration layer 4 was formed by use of a spin-coating method. A film-forming condition in the spin-coating method was such that the silica fine particle dispersion solution was dropped onto a surface of the SUS substrate while the SUS substrate was spun at 500 rpm for 5 second, and then the SUS substrate was spun at 3000 rpm for 10 seconds. The process was repeated two times under the above film-forming condition so that two layers of the fine particle layer were deposited on the SUS substrate, and then the layers were dried naturally at a room temperature.

The thin-film electrode 3 was formed, by use of a magnetron sputtering device, on a surface of the electron acceleration layer 4 so that an electron emitting element 1 (sample No. 12) was obtained. A material of the thin-film electrode 3 was gold, and the thin-film electrode 3 was formed so as to have a thickness of 40 nm and an area of 0.014 cm$^2$.

As a result of measuring a thickness of the electron acceleration layer of the electron emitting element 1 (sample No. 12) by use of a laser microscope (VK-9500, manufactured by Keyence Corporation), it was found out that the electron acceleration layer has a thickness of 0.3 µm.

An electron emission experiment was carried out with respect to the electron emitting element (sample No. 12) thus produced, by using the measurement system shown in FIG. 6 as in the Example 1.

As a result of measuring the electron emission current in vacuum at $1\times10^{-8}$ ATM, continuous electron emission current of $1.0\times10^{-4}$ A/cm$^2$ per unit area was measured at an applied voltage of 25.0V in the electron emitting element 1 (sample No. 12). That is, electron emission was confirmed. Here, the element resistance R was $3.9\times10^1$ Ω·cm$^2$ (point J in FIG. 5).

Embodiment 2

Figure 7:
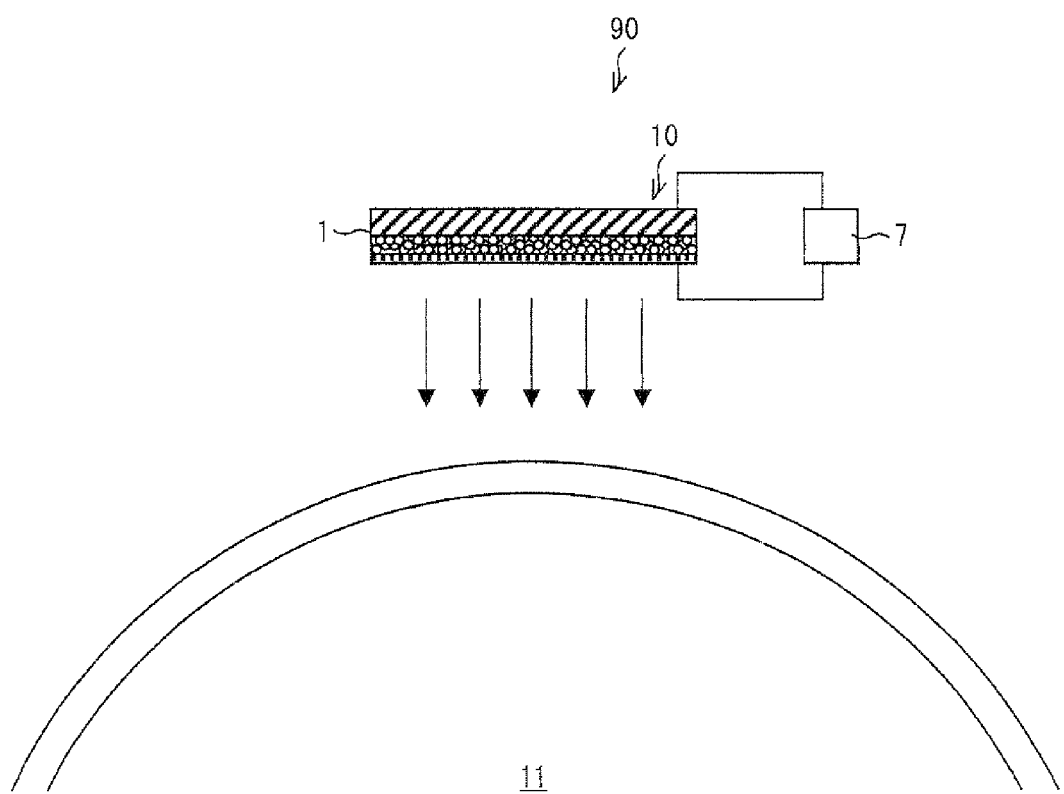
FIG. 7 is a view illustrating an example of a charging device including the electron emitting device of FIG. 1.

FIG. 7 illustrates one example of a charging device 90, according to the present invention, including an electron emitting device 10, described in Embodiment 1, employing an electron emitting element 1 according to one embodiment of the present invention. The charging device 90 includes the electron emitting device 10 including the electron emitting element 1 and a power supply 7 for applying a voltage to the electron emitting element 1. The charging device 90 is used for electrically charging a surface of a photoreceptor drum 11. An image forming apparatus of the present invention includes the charging device 90.

In the image forming apparatus of the present invention, the electron emitting element 1 in the charging device 90 is provided so as to face the photoreceptor drum 11 to be charged. Application of a voltage causes the electron emitting element 1 to emit electrons so that the surface of the photoreceptor drum 11 is electrically charged. In the image forming apparatus of the present invention, other than the charging device 90, known members can be used. The electron emitting element 1 serving as the charging device 90 is preferably provided so as to be, for example, 3 mm to 5 mm apart from the surface of the photoreceptor drum 11. Further, it is preferable that a voltage of approximately 25 V is applied to the electron emitting element. An electron acceleration layer of the electron emitting element 1 should be arranged such that 1 µA/cm$^2$ of electrons are emitted per unit of time in response to application of a voltage of 25V, for example.

Further, the electron emitting device 10 serving as the charging device 90 is configured as a planar electron source. Therefore, the electron emitting device 10 is capable of charging the photoreceptor drum 11 on an area that has a width in a rotation direction. This provides many chances for charging a section of the photoreceptor drum 11. Therefore, the charging device 90 can perform a more uniform electric charging as compared to a wire charging device electrically charging line by line a section on the photoreceptor drum 11. Further, the charging device 90 has an advantage such that the applied voltage is approximately 10 V which is far lower than that of a corona discharge device which requires an applied voltage of a few kV.

Embodiment 3

Figure 8:
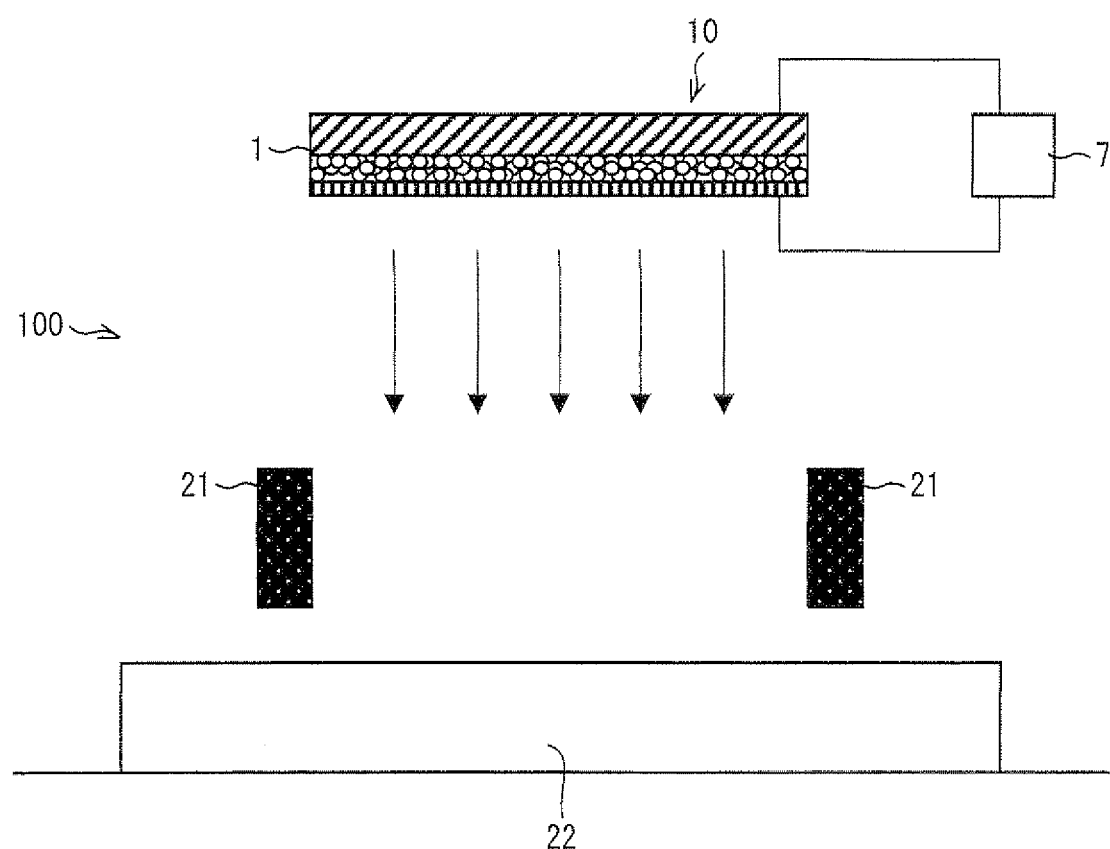
FIG. 8 is a view illustrating an example of an electron-beam curing device including the electron emitting device of FIG. 1.

FIG. 8 illustrates an electron-beam curing device 100 of the present invention including an electron emitting device 10, described in Embodiment 1, employing an electron emitting element 1 according to one embodiment of the present invention. The electron-beam curing device 100 includes the electron emitting device 10 including the electron emitting element 1 and a power supply 7 for applying a voltage to the electron emitting element 1, and an accelerating electrode 21 for accelerating electrons. In the electron-beam curing device 100, the electron emitting element 1 serving as an electron source emits electrons, and the electrons emitted are accelerated by the accelerating electrode 21 so that the electrons collide with a resist 22. Energy necessary for curing the general resist 22 is not more than 10 eV. In terms of energy, the accelerating electrode 21 is not necessary. However, a penetration depth of an electron beam is determined by a function of energy of electrons. For example, in order to entirely cure the resist 22 having a thickness of 1 µm, an accelerating voltage of approximately 5 kV is required.

In a conventional general electron-beam curing device, an electron source is sealed in vacuum and caused to emit electrons by application of a high voltage (in a range of 50 kV to 100 kV). The electrons are taken out through an electron window and used for irradiation. According to the above electron emission method, when the electrons pass through the electron window, loss of a large amount of energy occurs in the electrons. Further, the electrons that reach the resist pass through the resist in the thickness direction because the electrons have high energy. This decreases energy utilization efficiency. In addition, because an area on which electrons are thrown at a time is small and irradiation is performed in a manner drawing with dots, throughput is low.

The arrangement employing the electron emitting device 10 is free from energy loss because the electrons do not pass through the electron window. This allows reducing an applied voltage. Moreover, since the electron emitting device 10 is a planar electron source, the throughput increases significantly. In a case where electrons are emitted in accordance with a pattern, it is possible to perform a maskless exposure.

Embodiment 4

FIGS. 9 through 12 show examples of respective light emitting devices of the present invention each including an electron emitting device 10, described in Embodiment 1, employing an electron emitting element 1 according to one embodiment of the present invention.

Figure 9:
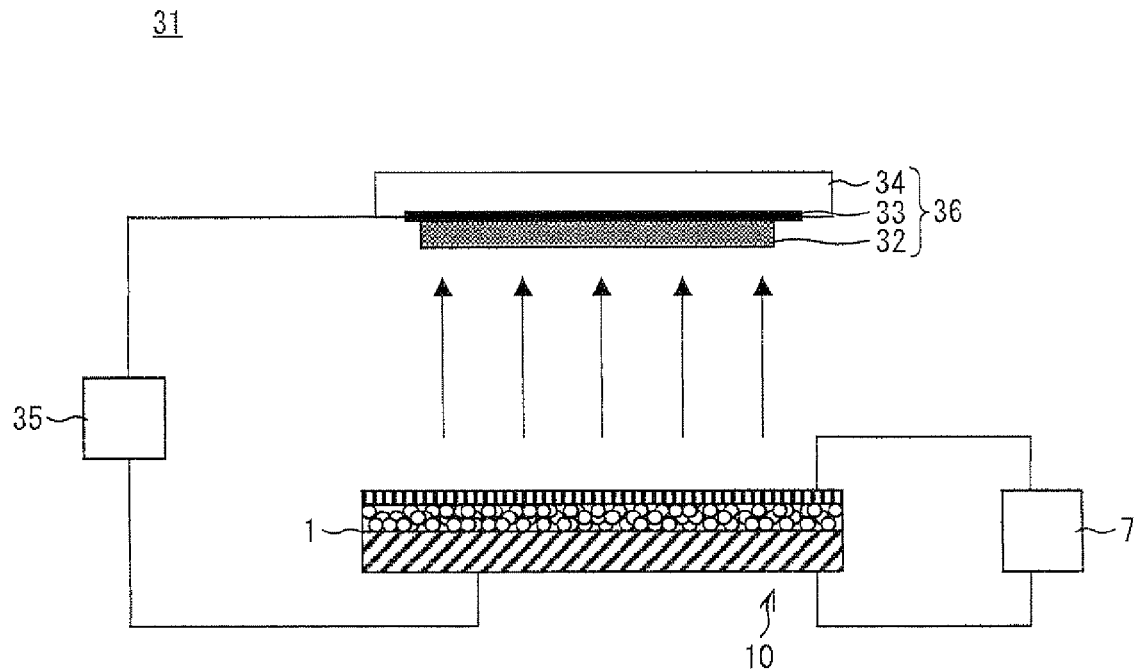
FIG. 9 is a view illustrating an example of a light emitting device including the electron emitting device of FIG. 1.

A light emitting device 31 illustrated in FIG. 9 includes the electron emitting device 10 including an electron emitting element 1 and a power supply 7 for applying a voltage to the electron emitting element 1, and a light-emitting section 36. The light-emitting section 36 has a laminated structure including a glass substrate 34 as a base material, an ITO film 33, and a luminous element 32. The light emitting section 36 is provided apart from the electron emitting element 1 so as to face the electron emitting element 1.

Suitable materials of the luminous element 32 are materials that are excited by electrons and that correspond to red light emission, green light emission, and blue light emission, respectively. Examples usable as such materials corresponding to red are $Y_2O_3$:Eu, and (Y, Gd) $Bo_3$:Eu; examples usable as such materials corresponding to green are $Zn_2SiO_4$:Mn and $BaAl_{12}O_{19}$:Mn; and an example usable as such materials corresponding to blue is $BaMgAl_{10}O_{17}$:Eu$^{2+}$. A film of the luminous element 32 is formed on the ITO film 33 which is formed on the glass substrate 34. It is preferable that the luminous element 32 is approximately 1 μm in thickness. Further, the ITO film 33 may have any thickness as long as the ITO film 33 can reliably have electric conductivity at the thickness. In the present embodiment, the ITO film 33 is set to 150 nm in thickness.

For forming a film of the luminous element 32, a mixture of epoxy resin serving as a binder and luminous-element particles is prepared, and a film of the mixture may be formed by a known method such as a bar coater method or a dropping method.

Figure 12:
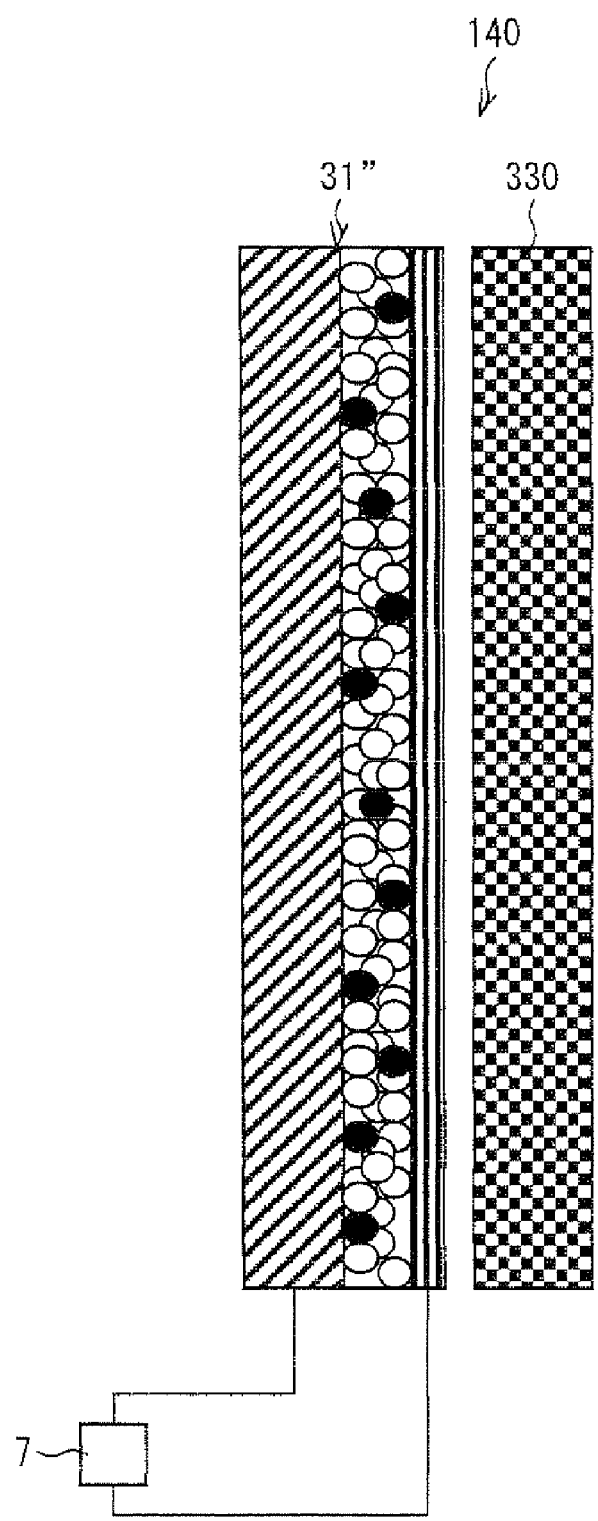
FIG. 12 is a view illustrating an example of an image display device including a light emitting device including the electron emitting device of FIG. 1.

In this embodiment, in order to increase a brightness of light emitted from the luminous element 32, it is necessary to accelerate, toward the luminous element 32, electrons which are emitted from the electron emitting element 1. In order to realize such acceleration, as illustrated in FIG. 12, it is preferable that a power supply 35 be provided between the electrode substrate 2 of the electron emitting element 1 and the ITO film 33 of the light-emitting section 36. This arrangement allows application of a voltage for causing an electric field for accelerating the electrons. In this case, it is preferable that: (i) a distance between the luminous element 32 and the electron emitting element 1 is 0.3 mm to 1 mm; a voltage applied by the power supply 7 is 18V; and a voltage applied by the power supply 35 is 500 V to 2000 V.

Figure 10:
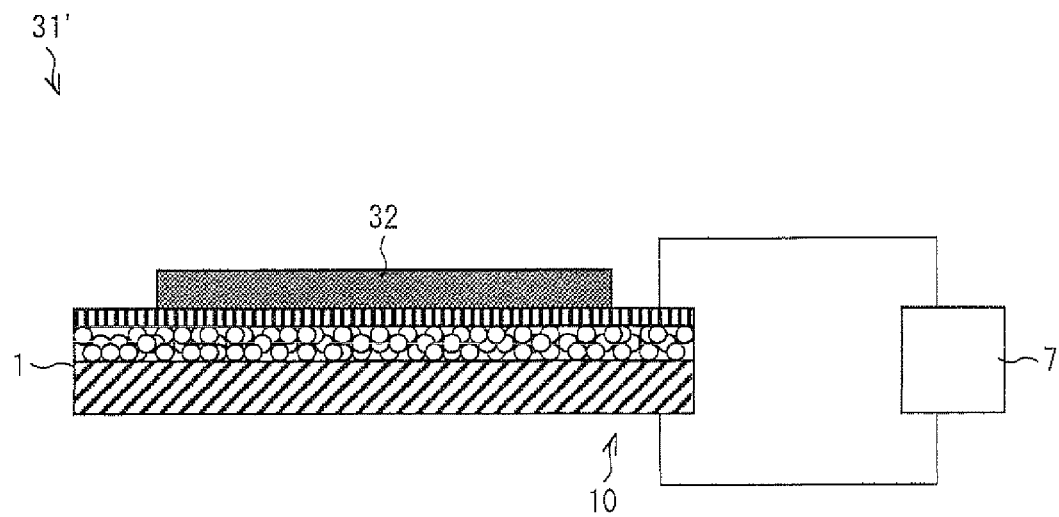
FIG. 10 is a view illustrating another example of a light emitting device including the electron emitting device of FIG. 1.

A light emitting device 31' shown in FIG. 10 includes the electron emitting device 10 including an electron emitting element 1 and a power supply 7 for applying a voltage to the electron emitting element 1, and a luminous element (light emitting element) 32. In the light emitting device 31', the luminous element 32 is a planar luminous element which is provided on a surface of the electron emitting element 1. In the present embodiment, a layer of the luminous element 32 is formed on a surface of the electron emitting element 1, in such a manner that a mixture of epoxy resin serving as a binder and luminous-element particles is prepared as described above and a film of the mixture is formed on the surface of the electron emitting element 1. Note that, because the electron emitting element 1 itself has a structure which is vulnerable to external force, the element may be damaged as a result of use of the bar coater method. Therefore, it is preferable to use the dropping method or the spin coating method.

Figure 11:
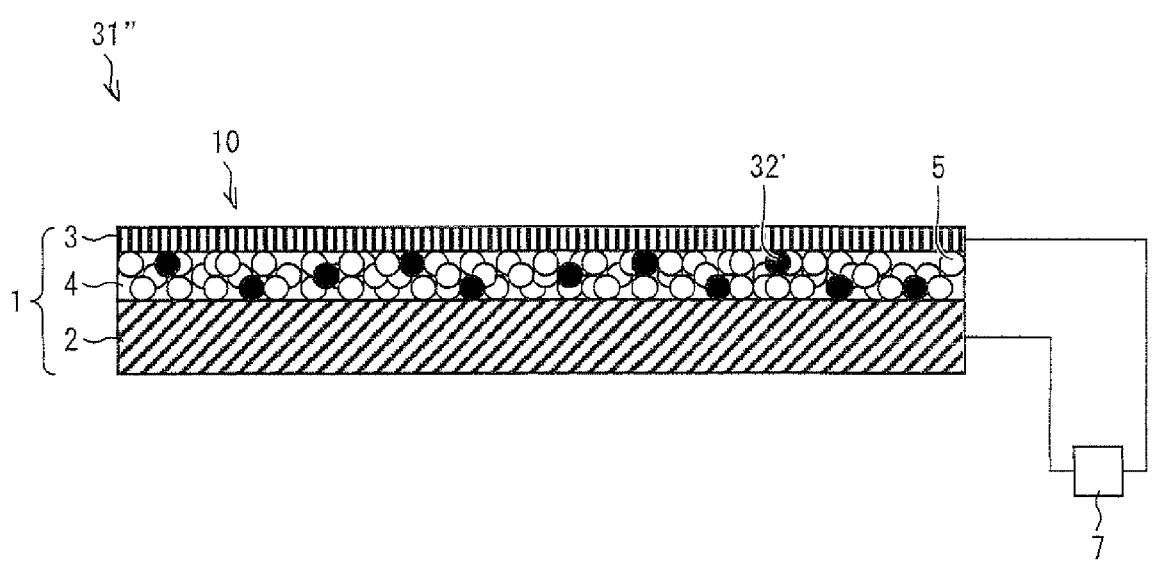
FIG. 11 is a view illustrating further another example of a light emitting device including the electron emitting device of FIG. 1.

A light emitting device 31" shown in FIG. 11 includes the electron emitting device 10 including an electron emitting element 1 and a power supply 7 for applying a voltage to the electron emitting element 1. Further, in an electron acceleration layer 4 of the electron emitting element 1, luminous fine particles as a luminous element (light emitting element) 32' are mixed in. In this case, the luminous element 32' may be arranged to also serve as the insulating fine particles 5. Generally, however, the luminous-element fine particles have a low electric resistance. As compared to electric resistance of the insulating fine particles 5, the electric resistance of the luminous-element fine particles is clearly lower. Therefore, when the luminous-element fine particles are mixed in replacement of the insulating fine particles 5, an amount of the luminous-element fine particles should be suppressed to a small amount. For example, when spherical silica particles (average particle diameter of 110 nm) are used as the insulating fine particles 5 and ZnS:Mg (average particle diameter of 500 nm) is used as the luminous-element fine particles, an appropriate mixture ratio by weight of the insulating fine particles 5 and the luminous-element fine particles is approximately 3:1.

In the above light emitting devices 31, 31', and 31", electrons emitted from the electron emitting element 1 are caused to collide with the corresponding luminous bodies 32 and 32' so that light is emitted. The electron emitting element 1 is improved in the amount of the electrons emitted, and therefore, the light emitting devices 31, 31' and 31" can emit light efficiently. If the light emitting devices 31, 31', and 31" are sealed in vacuum, the light emitting devices 31, 31', and 31" can work more efficiently because the electron emission current improves.

FIG. 12 illustrates an example of an image display device of the present invention which includes a light emitting device of the present invention. An image display device 140 illustrated in FIG. 12 includes a light emitting device 31" illustrated in FIG. 11, and a liquid crystal panel 330. In the image display device 140, the light emitting device 31" is provided behind the crystal panel 330 and used as a backlight. In cases where the light emitting device 31" is used in the image display device 140, it is preferable that a voltage of 20 V to 35 V is applied to the light emitting device 31". The light emitting device 31" should be arranged to emit, for example, 10 μA/cm$^2$ of electrons per unit of time at the voltage of 20 V to 35 V. Further, it is preferable that a distance between the light emitting device 31" and the liquid crystal panel 330 is approximately 0.1 mm.

In cases where light emitting devices 31 illustrated in FIG. 9 are used as an image display device of the present invention, the light emitting devices 31 may be arranged in a matrix so as to form a shape that allows the light emitting devices 31 themselves serving as an FED to form and display an image. In such cases, it is preferable that a voltage applied to the light emitting device 31 is in a range of 20 V to 35 V. The light emitting device 31 should be arranged to emit, for example, 10 μA/cm$^2$ of electrons per unit of time, at the applied voltage in the range of 20 V to 35 V.

Embodiment 5

Figure 13:
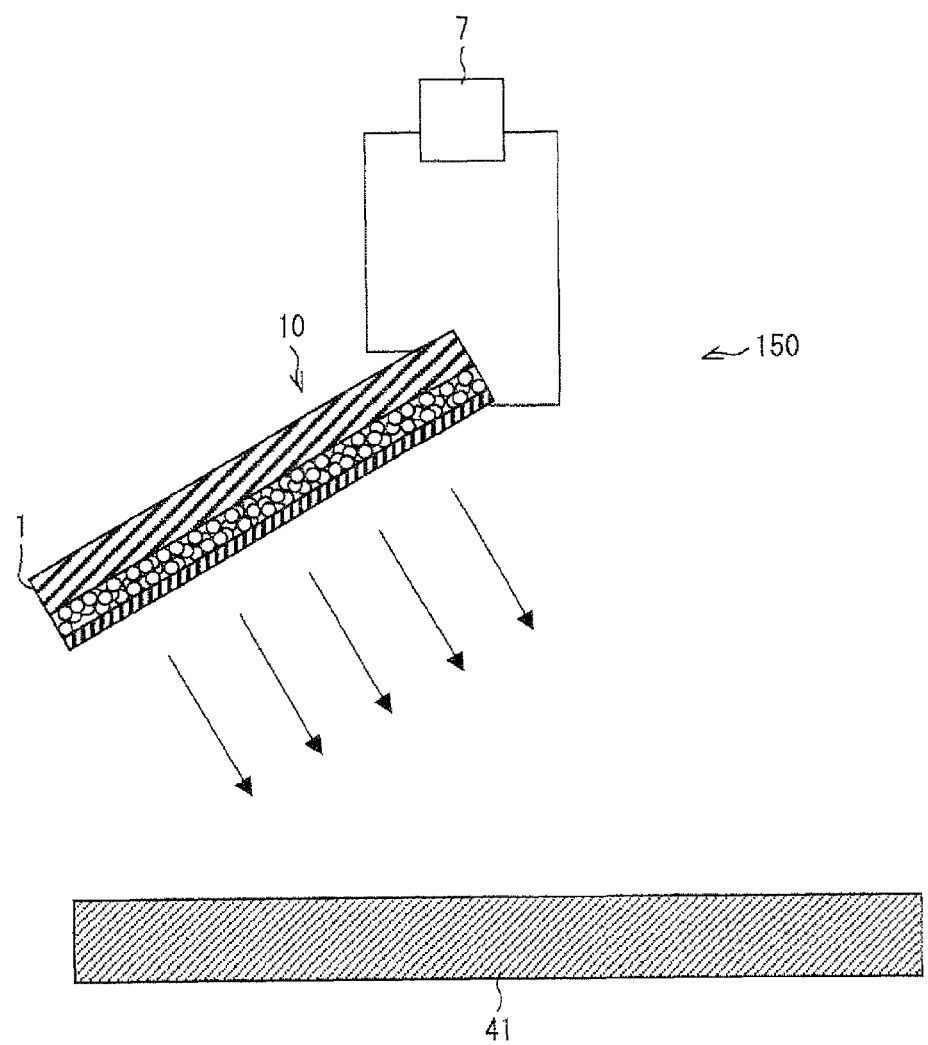
FIG. 13 is a view illustrating an example of an air blowing device including the electron emitting device of FIG. 1 and a cooling device including the air blowing device.
Figure 14:
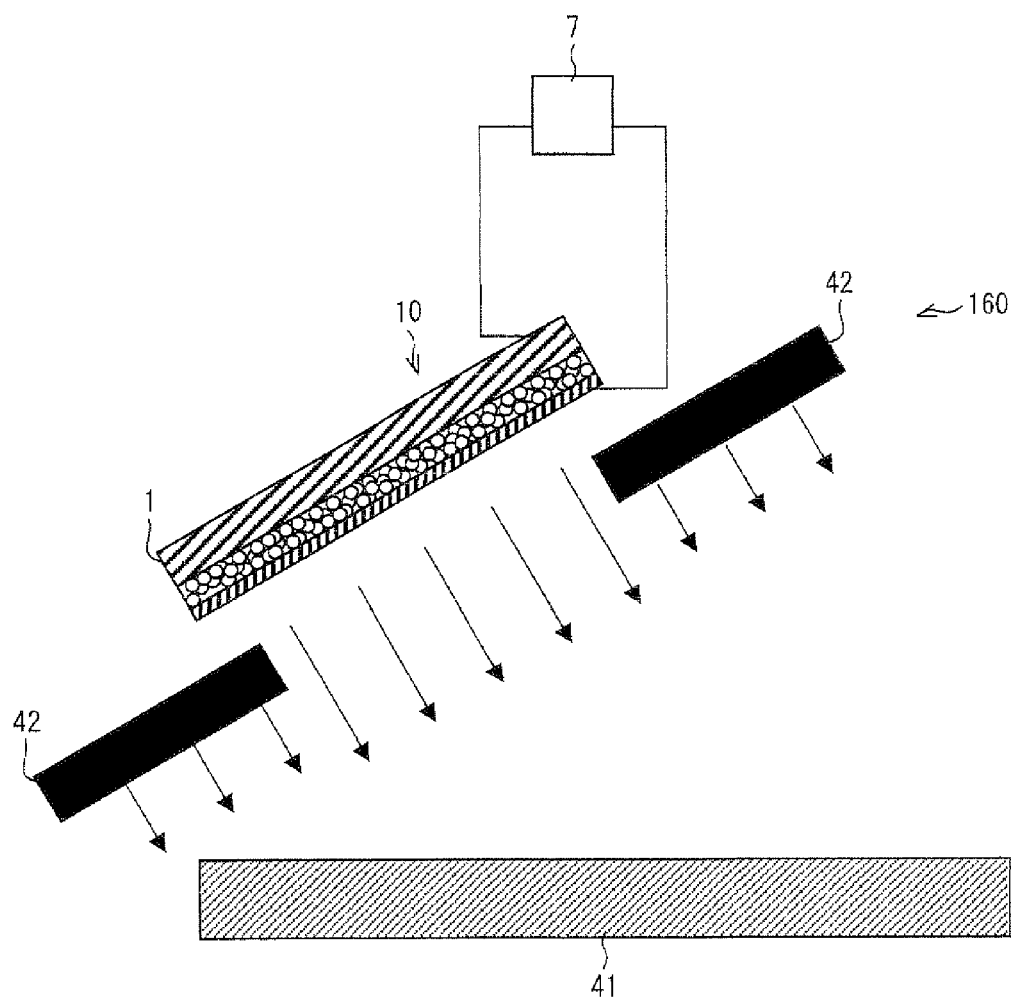
FIG. 14 is a view illustrating another example of an air blowing device including the electron emitting device of FIG. 1 and a cooling device including the air blowing device.

FIG. 13 and FIG. 14 illustrate examples of air blowing devices of the present invention each including an electron emitting device 10, described in Embodiment 1, employing an electron emitting element 1 according to one embodiment of the present invention. The following explanation deals with a case where each of the air blowing devices of the present invention is used as a cooling device. However, application of the air blowing device is not limited to a cooling device.

An air blowing device 150 illustrated in FIG. 13 includes the electron emitting device 10 including an electron emitting element 1 and a power supply 7 for applying a voltage to the electron emitting element 1. In the air blowing device 150, the electron emitting element 1 emits electrons toward an object 41 to be cooled so that ion wind is generated and the object 41 electrically grounded is cooled. In cases where the object 41 is cooled, it is preferable that a voltage of approximately 18 V is applied to the electron emitting element 1 and, at this applied voltage of approximately 18 V, the electron emitting element 1 emits, for example, 1 μA/cm² of electrons per unit of time in the atmosphere.

In addition to the arrangement of the air blowing device 150 illustrated in FIG. 13, an air blowing device 160 illustrated in FIG. 14 further includes a blowing fan 42. In the air blowing device 160 illustrated in FIG. 14, an electron emitting element 1 emits electrons toward an object 41 to be cooled and the blowing fan 42 blows the electrons toward the object 41 so that the object 41 electrically grounded is cooled down by generation of ion wind. In this case, it is preferable that an air volume generated by the blowing fan 42 is in a range of 0.9 L to 2 L per minute per square centimeter.

Now, a case where the object 41 is to be cooled by blowing air is considered. In a case where the object 41 is cooled by blowing only the atmospheric air with use of a fan or the like as in a conventional air blowing device or a conventional cooling device, cooling efficiency is low because a flow rate on a surface of the object 41 becomes 0 and the air in a section from which heat should be dissipated the most is not replaced. However, in cases where electrically charged particles such as electrons or ions are included in the air sent as wind (airflow) to the object 41, the air sent to the object 41 is attracted to the surface of the object 41 by electric force in the vicinity of the object 41. This makes it possible to replace the air in the vicinity of the surface of the object 41. In the present embodiment, because the air blowing devices 150 and 160 of the present invention blow air including electrically charged particles such as electrons or ions, the cooling efficiency is significantly improved.

As describe above, an electron emitting element of the present invention includes: an electrode substrate and a thin-film electrode which are provided so as to face each other; and an electron acceleration layer sandwiched between the electrode substrate and the thin-film electrode, as a result of a voltage applied between the electrode substrate and the thin-film electrode, electrons being accelerated in the electron acceleration layer so as to be emitted from the thin-film electrode, wherein: the electron acceleration layer includes a fine particle layer containing at least insulating fine particles, and $$Ie = \alpha \cdot R^{-0.67}$$

where Ie [A/cm²] is electron emission current per unit area during voltage application and R is element resistance [Ω·cm²] per unit area, the element resistance being obtained by dividing (a) the voltage applied between the electrode substrate and the thin-film electrode during the voltage application by (b) current in element per unit area which current flows between the electrode substrate and the thin-film electrode during the voltage application, and where α is not less than $2.0 \times 10^{-6}$, and the electron emission current Ie is not less than $1.0 \times 10^{-9}$.

In addition to the above arrangement, the electron emitting element of the present invention may be arranged such that the insulating fine particles have an average particle diameter in a range of 7 nm to 1000 nm. In this case, diameters of the fine particles may be broadly distributed with respect to the average particle diameter. For example, fine particles having an average particle diameter of 50 nm may have particle diameter distribution in a range of 20 nm to 100 nm. In a case where the particle diameter of the insulating fine particles is too small, the particles easily cohere to one another because strong force works between the particles, thereby resulting in that dispersion of the particles becomes difficult. Further, in a case where the particle diameter of the insulating fine particles is too large, although the insulating fine particles are dispersed very well, it is difficult to adjust a thickness of the electron acceleration layer or a content ratio of a surface conducive material in order to adjust resistance.

In addition to the above arrangement, the electron emitting element of the present invention may be arranged such that the insulating fine particles contain at least one of an organic polymer, $SiO_2$, $Al_2O_3$, and $TiO_2$. By arranging the insulating fine particles to contain at least one of an organic polymer, $SiO_2$, $Al_2O_3$, and $TiO_2$, it becomes possible to adjust a resistance value in any range due to a high insulating property of the above substances. In particular, in a case where oxide (of $SiO_2$, $Al_2O_3$, and $TiO_2$) is used as the insulating fine particles and conductive fine particles having a high resistance to oxidation is used as the surface conductive material, element degradation due to oxidation caused by oxygen in the atmosphere is made more difficult to occur. Therefore, the effect of steadily operating the electron emitting element under the atmospheric pressure can be obtained more significantly.

The electron emitting element of the present invention may be arranged such that the fine particle layer further contains at least one of (i) conductive fine particles and (ii) a basic dispersant.

The electron acceleration layer containing, in the fine particle layer, the conductive fine particles is a thin-film layer in which the insulating fine particles and the conductive fine particles are densely assembled, and has a semi-conductive property. Application of a voltage to such a semi-conductive electron acceleration layer causes current to flow through the electron acceleration layer, and causes a part of electrons in the current to be emitted, as ballistic electrons, due to an intense electric field formed by the applied voltage.

Although a mechanism of electron emission in the electron acceleration layer containing, in the fine particle layer, the basic dispersant has not been determined yet, application of a voltage between the electrode substrate and the thin-film electrode causes current to flow through the electron acceleration layer, and causes a part of electrons in the current to be emitted from a thin-film electrode side, as ballistic electrons, due to an intense electric field formed by the applied voltage. Here, it is considered that an electron pair donor that donates a pair of electrons, included in the basic dispersant, causes electrons to be emitted from the electron emitting element. That is, the basic dispersant includes the electron pair donor that donates a pair of electrons, and the electron pair donor is ionized after donating the pair of electrons. It is considered that the ionized electron pair donor transfers electric charge on a surface of the insulating fine particle to which the electron pair donor is attached, thereby allowing electric conduction on the surface of the insulating fine particle.

According to the arrangement, in addition to a shape of the thin-film electrode, a material, a particle diameter, and an additive amount of the conductive fine particle, and a type and an additive amount of the basic dispersant are added as parameters for changing a resistance value of the electron acceleration layer. This allows easier adjustment of the resistance value of the electron acceleration layer, thereby allowing easier adjustment of an amount of ballistic electrons to be generated.

In addition to the above arrangement, the electron emitting element of the present invention may be arranged such that, in a case where the fine particle layer contains the conductive fine particles, the conductive fine particles are conductors having high resistance to oxidation.

The high resistance to oxidation indicates that an oxide formation reaction is low. In general, according to a thermodynamic calculation, when a value of a change ΔG [kJ/mol] in free energy of oxide formation is negative and greater, the oxide formation reaction occurs more easily. According to the present invention, metal elements which satisfy ΔG<450 [kJ/mol] are conductive fine particles having high resistance to oxidation. Moreover, the conductive fine particles having high resistance to oxidation may be conductive fine particles in which the oxide formation reaction is made more difficult to occur by causing an insulating material smaller than the conductive fine particles to be attached or coat the conductive fine particles.

According to the arrangement, since conductor having high resistance to oxidation is used as the conductive fine particles, element degradation due to oxidation caused by oxygen in the atmosphere is made more difficult to occur. Therefore, it is possible to stably operate the electron emitting element under the atmospheric pressure. This allows an increase in life of the electron emitting element, and allows the electron emitting element to consecutively operate for a long time period even in the atmosphere.

In addition to the above arrangement, the electron emitting element of the present invention may be arranged such that the conductive fine particles are noble metal. In a case where the conductive fine particles are noble metal, it is possible to prevent element degradation such as oxidation, of the conductive fine particles, caused by oxygen in the atmosphere. This allows an increase in life of the electron emitting element.

Specifically, the conductive fine particles may be configured to contain at least one of gold, silver, platinum, palladium, and nickel. In a case where the conductive fine particles may be configured to contain at least one of gold, silver, platinum, palladium, and nickel, it is possible to more effectively prevent element degradation such as oxidation, of the conductive fine particles, caused by oxygen in the atmosphere. This more effectively allows an increase in life of the electron emitting element.

In addition to the above arrangement, the electron emitting element of the present invention is preferably arranged such that the conductive fine particles have an average diameter in a range of 3 nm to 10 nm. This is because the conductive fine particles need to be smaller than the insulating material so that electric conductivity is controlled. In a case where the conductive fine particles have an average particle diameter smaller than that of the insulating material, and preferably have an average particle diameter in a range of 3 nm to 10 nm, a conductive path due to the conductive fine particles is not formed in the electron acceleration layer. As a result, dielectric breakdown becomes difficult to occur in the electron acceleration layer. Further, use of the conductive fine particles whose particle diameter falls in the above range allows efficient generation of ballistic electrons although a principle of such efficient generation of the ballistic electrons has not been determined yet.

In addition to the above arrangement, the electron emitting element of the present invention may be arranged such that an insulating substance is provided around the conductive fine particles, the insulating substance being smaller in size than the conductive fine particles. In a case where an insulating substance is provided around the conductive fine particles, the insulating substance being smaller in size than the conductive fine particles, such an insulating substance contributes to improvement in dispersibility of the conductive fine particles in a dispersion solution at the time of production of the element. Further, the presence of such an insulating substance makes it possible to more effectively prevent element degradation such as oxidation, of the conductive fine particles, caused by oxygen in the atmosphere. This more effectively allows an increase in life of the electron emitting element.

In addition to the above arrangement, the electron emitting element of the present invention may be arranged such that the insulating substance provided around the conductive fine particles contains at least one of alcoholate, aliphatic acid, and alkanethiol. In a case where the insulating substance provided around the conductive fine particles contains at least one of alcoholate, aliphatic acid, and alkanethiol, such an insulating substance contributes to improvement in dispersibility of the conductive fine particles in a dispersion solution at the time of production of the element, thereby making it difficult for an abnormal current path caused by an aggregate of the conductive fine particles to occur. In addition, such an insulating substance can prevent a change in particle composition which change is caused by oxidation of the conductive fine particles themselves located around an insulating substance. Therefore, an electron emission property is not affected. This more effectively allows an increase in life of the electron emitting element.

The electron emitting element of the present invention may be arranged such that the insulating material is an adhering substance which adheres to a surface of each of the conductive fine particles, and the adhering substance is an insulating coating film that coats a surface of the conductive fine particle, as an aggregate of particles whose average particle diameter is smaller than that of the conductive fine particles. In a case where the insulating material adheres to a surface of each of the conductive fine particles or coats a surface of the conductive fine particle, as an aggregate of particles whose average particle diameter is smaller than that of the conductive fine particles, such an insulating material contributes to improvement in dispersibility of the conductive fine particles in a dispersion solution at the time of production of the element, thereby making it difficult for an abnormal current path caused by an aggregate of the conductive fine particles to occur. In addition, such an insulating material can prevent a change in particle composition which change is caused by oxidation of the conductive fine particles themselves located around an insulating material. Therefore, an electron emission property is not affected. This more effectively allows an increase in life of the electron emitting element.

In addition to the arrangement, the electron emitting element of the present invention may be arranged such that the basic dispersant includes a polymeric material that disperses the insulating fine particles due to its steric repulsion effect, into which polymeric material an electron pair donor that donates a pair of electrons is introduced as a substituent.

Since the basic dispersant includes a polymeric material that disperses the insulating fine particles due to its steric repulsion effect, it is possible to successfully disperse the insulating fine particles, thereby allowing forming a uniform fine particle layer as the electron acceleration layer. As a result, it is possible to restrain production tolerance of the electron emitting element.

Further, there is an optimal value in an additive amount of the basic dispersant. In a case where the additive amount is excessive, a resistive component of the polymeric material included in the basic dispersant may cause current in the element to be difficult to flow, thereby resulting in that electron emission from the electron emitting element may be decreased. On the other hand, in a case where the additive amount is far below its lower limit, it is difficult to obtain a sufficient amount of current flowing in the electron acceleration layer, thereby resulting in that no electron emission can be obtained at all from the electron emitting element. The additive amount of the basic dispersant is optimally designed in association with the insulating fine particles. By adequately controlling the additive amount, it is possible to obtain sufficient electron emission from the electron emitting element.

In addition to the above arrangement, the electron emitting element of the present invention may be arranged such that the thin-film electrode contains at least one of gold, silver, carbon, tungsten, titanium, aluminum, and palladium. Since the thin-film electrode contains at least one of gold, silver, carbon, tungsten, titanium, aluminum, and palladium, tunneling of electrons generated by the electron acceleration layer becomes more efficient due to a low work function of the above substances. As a result, it is possible to emit more electrons having high energy to the outside of the electron emitting element.

In addition to the above arrangement, the electron emitting element of the present invention may be arranged such that $Ie \geq 1.0 \times 10^{-6}$ is satisfied. In a case where $Ie \geq 1.0 \times 10^{-6}$ is satisfied, it is possible to secure a property of uniform electron emission in a planar direction. In a case where the electron emission current density Ie is out of the above range, electrons are just locally emitted from a part of a surface of the element, regardless of magnitude of a voltage applied to the electron emitting element. Therefore, electron emission from an entire surface of the element cannot be expected. The application of such an electron emitting element locally emitting electrons to a light emitting display element of an FED structure causes a luminance defect such as variation in bright dot.

An electron emitting device of the present invention includes: any one of the aforementioned electron emitting elements; and a power supply section for applying a voltage between an electrode substrate and a thin-film electrode provided in the any one of the aforementioned electron emitting elements.

As has been already described in terms of the electron emitting element, the electron emitting element of the present invention is an electron emitting element which does not cause insulation breakdown in an insulating layer and which can be produced by use of an inexpensive device. Therefore, the electron emitting device employing the electron emitting element is also an electron emitting device which does not cause insulation breakdown in an insulating layer and which can be produced by use of an inexpensive device.

Further, a light emitting device, an image display device, an air blowing device, a cooling device, a charging device, an image forming apparatus, and an electron-beam curing device, each employing the electron emitting device of the present invention, are included in the scope of the present invention.

The present invention is not limited to the description of the embodiments and examples above, but may be altered by a skilled person within the scope of the claims. An embodiment based on a proper combination of technical means disclosed in different embodiments is encompassed in the technical scope of the present invention.

INDUSTRIAL APPLICABILITY

The electron emitting element of the present invention can assure electric conduction and flow sufficient current in the element, thereby causing ballistic electrons to be emitted from the thin-film electrode. As a result, the electron emitting element of the present invention can be suitably applied, for example, (i) to a charging device of image forming apparatuses such as an electrophotographic copying machine, a printer, and a facsimile; (ii) an electron-beam curing device; (iii) in combination with a luminous element, to an image display device; or (iv) by utilizing ion wind generated by electrons emitted from the electron emitting element, to a cooling device.

REFERENCE SIGNS LIST

1: Electron Emitting Element
2: Electrode Substrate
3: Thin-Film Electrode
4: Electron Acceleration Layer
4a: Electron Acceleration Layer
4b: Electron Acceleration Layer
5: Insulating Fine Particles
6: Conductive fine particles
7: Power Supply (Power supply section)
7A: Power Supply (Power supply section)
7B: Power Supply (Power supply section)
8: Counter Electrode
9: Insulating Spacer
10: Electron Emitting Device
11: Photoreceptor Drum
21: Acceleration Electrode
22: Resist
31, 31', 31": Light Emitting Device
32, 32': Luminous Element (Light emitting element)
33: ITO Film
34: Glass Substrate
35: Power Supply
36: Light Emitting Section
41: Object to be cooled
42: Air Blowing Fan
90: Charging Device
100: Electron-beam Curing Device
140: Image Display Device
150: Air Blowing Device
160: Air Blowing Device
330: Liquid Crystal Panel

The invention claimed is:
1. An electron emitting element comprising:
an electrode substrate and a thin-film electrode which are provided so as to face each other; and
an electron acceleration layer sandwiched between the electrode substrate and the thin-film electrode,
as a result of a voltage applied between the electrode substrate and the thin-film electrode, electrons being accelerated in the electron acceleration layer so as to be emitted from the thin-film electrode,
wherein:
the electron acceleration layer includes a fine particle layer containing at least insulating fine particles, and

$$Ie = \alpha \cdot R^{-0.67}$$

where Ie [A/cm$^2$] is electron emission current per unit area during voltage application and R is element resistance [Ω·cm$^2$] per unit area, the element resistance being obtained by dividing (a) the voltage applied between the electrode substrate and the thin-film electrode during the voltage application by (b) current in element per unit area which current flows between the electrode substrate and the thin-film electrode during the voltage application, and
where α is not less than $2.0 \times 10^{-6}$, and the electron emission current Ie is not less than $1.0 \times 10^{-9}$.
2. The electron emitting element according to claim 1, wherein the insulating fine particles have an average particle diameter in a range of 7 nm to 1000 nm.

3. The electron emitting element according to claim 1, wherein the insulating fine particles contain at least one of an organic polymer, $SiO_2$, $Al_2O_3$, and $TiO_2$.

4. The electron emitting element according to claim 1, wherein the fine particle layer contains at least one of (i) conductive fine particles and (ii) a basic dispersant.

5. The electron emitting element according to claim 4, wherein: the fine particle layer contains the conductive fine particles, and the conductive fine particles are conductors having high resistance to oxidation.

6. The electron emitting element according to claim 5, wherein the conductive fine particles contain at least one of gold, silver, platinum, palladium, and nickel.

7. The electron emitting element according to claim 5, wherein the conductive fine particles have an average particle diameter in a range of 3 nm to 10 nm.

8. The electron emitting element according to claim 5, wherein a small insulating substance is provided around the conductive fine particles, the small insulating substance being smaller in size than the conductive fine particles.

9. The electron emitting element according to claim 8, wherein the small insulating substance contains at least one of alcoholate, aliphatic acid, and alkanethiol.

10. The electron emitting element according to claim 5, wherein the conductive fine particles are noble metal.

11. The electron emitting element according to claim 10, wherein the conductive fine particles contain at least one of gold, silver, platinum, palladium, and nickel.

12. The electron emitting element according to claim 4, wherein: the fine particle layer contains the basic dispersant, and the basic dispersant includes a polymeric material that disperses the insulating fine particles due to its steric repulsion effect, into which polymeric material an electron pair donor that donates a pair of electrons is introduced as a substituent.

13. The electron emitting element according to claim 1, wherein the thin-film electrode contains at least one of gold, silver, carbon, tungsten, titanium, aluminum, and palladium.

14. The electron emitting element according to claim 1, wherein the electron emission current Ie is not less than $1.0\times10^{-6}$.

15. An electron emitting device comprising:
an electron emitting element as set forth in claim 14; and
a power supply section for applying the voltage between the electrode substrate and the thin-film electrode each provided in the electron emitting element.

16. A light emitting device comprising:
an electron emitting device as set forth in claim 15; and
a light emitting element,
the light emitting element emitting light by receiving the electrons emitted from the electron emitting device.

17. An image display device comprising a light emitting device as set froth in claim 16.

18. An electron emitting device comprising:
an electron emitting element as set forth in claim 1; and
a power supply section for applying the voltage between the electrode substrate and the thin-film electrode each provided in the electron emitting element.

19. An air blowing device comprising:
an electron emitting device as set forth in claim 18,
the air blowing device causing the electron emitting device to emit electrons and blowing the electrons.

20. A cooling device comprising:
an electron emitting device as set forth in claim 18,
the cooling device cooling an object by using the electrons emitted from the electron emitting device.

21. A charging device comprising:
an electron emitting device as set forth in claim 18,
the charging device charging a photoreceptor by using the electrons emitted from the electron emitting device.

22. An image forming apparatus comprising a charging device as set forth in claim 21.

23. An electron-beam curing device comprising an electron emitting device as set forth in claim 18.

* * * * *